United States Patent
Akiyama

(10) Patent No.: US 11,313,762 B2
(45) Date of Patent: Apr. 26, 2022

(54) DYNAMOMETER CONTROL DEVICE

(71) Applicant: MEIDENSHA CORPORATION, Tokyo (JP)

(72) Inventor: Takao Akiyama, Tokyo (JP)

(73) Assignee: MEIDENSHA CORPORATION, Tokyo (JP)

(*) Notice: Subject to any disclaimer, the term of this patent is extended or adjusted under 35 U.S.C. 154(b) by 0 days.

(21) Appl. No.: 17/434,384

(22) PCT Filed: Dec. 13, 2019

(86) PCT No.: PCT/JP2019/048854
§ 371 (c)(1),
(2) Date: Aug. 26, 2021

(87) PCT Pub. No.: WO2020/174814
PCT Pub. Date: Sep. 3, 2020

(65) Prior Publication Data
US 2022/0065750 A1  Mar. 3, 2022

(30) Foreign Application Priority Data

Feb. 28, 2019 (JP) .............................. JP2019-036046

(51) Int. Cl.
*G01L 3/10* (2006.01)
*G01M 15/02* (2006.01)
(Continued)

(52) U.S. Cl.
CPC ............... *G01M 15/02* (2013.01); *G01L 3/10* (2013.01); *G01L 25/003* (2013.01); *B62D 5/00* (2013.01); *G01M 13/025* (2013.01)

(58) Field of Classification Search
CPC ...... G01M 15/02; G01M 13/025; B62D 5/00; G01L 3/10; G01L 25/003
See application file for complete search history.

(56) References Cited

U.S. PATENT DOCUMENTS 2,785,367 A * 3/1957 Roman ............... G01M 15/044
388/816
3,330,153 A * 7/1967 Perna, Jr. ............ G01M 13/025
73/115.08
(Continued)

FOREIGN PATENT DOCUMENTS

JP   2001-239947 A   9/2001
JP   2013-257234 A   12/2013
(Continued)

OTHER PUBLICATIONS

Notice of Reasons for Rejection issued to JP Application No. 2019-036046, dated Jan. 28, 2020.
(Continued)

*Primary Examiner* — Max H Noori
(74) *Attorney, Agent, or Firm* — Muncy, Geissler, Olds & Lowe, P.C.

(57) ABSTRACT

An input-side control device includes a first input signal generation unit for generating a first input signal on the basis of the deviation between an engine torque command signal and an input-side shaft torque detection signal; a second input signal generation unit for generating a second input signal on the basis of an input-side speed detection signal weighted according to a prescribed weighting signal; and a torque command signal generation unit for generating a torque command signal on the basis of the first and second input signals. If the value of a filtered signal obtained from the input-side speed detection signal is less than a prescribed threshold, the second input signal generation unit makes the value of the weighting signal lower than if the value of the filtered signal were greater than or equal to the threshold.

14 Claims, 12 Drawing Sheets

(51) Int. Cl.
*G01L 25/00* (2006.01)
*B62D 5/00* (2006.01)
*G01M 13/025* (2019.01)

(56) References Cited

U.S. PATENT DOCUMENTS

| | | | |
|---|---|---|---|
| 11,204,302 B2* | 12/2021 | Yamaguchi | G01M 13/025 |
| 2015/0142341 A1 | 5/2015 | Akiyama et al. | |
| 2015/0219529 A1 | 8/2015 | Akiyama et al. | |
| 2018/0003589 A1* | 1/2018 | Akiyama | G01M 15/02 |
| 2018/0328815 A1* | 11/2018 | Akiyama | G01M 15/044 |
| 2020/0271539 A1* | 8/2020 | Akiyama | G01M 13/025 |
| 2021/0215109 A1* | 7/2021 | Martin | F02B 63/042 |

FOREIGN PATENT DOCUMENTS

| | | |
|---|---|---|
| JP | 2014-128117 A | 7/2014 |
| JP | 6390774 B1 | 9/2018 |
| JP | 2019-052862 A | 4/2019 |
| WO | WO-2014/010409 A1 | 1/2014 |

OTHER PUBLICATIONS

Notice of Decision to Grant a Patent issued to JP Application No. 2019-036046, dated Jun. 16, 2020.

* cited by examiner

DYNAMOMETER CONTROL DEVICE

TECHNICAL FIELD

The present invention relates to a dynamometer control device. More particularly, the present invention relates to a dynamometer control device for performing electrical inertia control in a test system including a test piece provided with an input shaft and an output shaft, such as a drivetrain of a vehicle, and a dynamometer coupled to the input shaft of the test piece.

BACKGROUND ART

Drivetrain collectively refers to a plurality of devices that transmit energy generated by an engine to drive wheels, and includes the engine, a clutch, a transmission, a drive shaft, a propeller shaft, differential gears, the drive wheels, and the like. A test system for the drivetrain evaluates the durability, quality, or the like of the drivetrain while applying a loading torque, which simulates the inertia of tires or a vehicle body, to an output shaft by causing the engine to actually drive the transmission, and performing electrical inertia control of an output-side dynamometer connected to the output shaft of the drivetrain (for example, refer to Patent Document 1). In addition, in recent years, a test system has been proposed that generates a driving torque, which is inputted to an input shaft of the drivetrain, with an input-side dynamometer instead of the actual engine (for example, refer to Patent Document 2).

Incidentally, an actual moment of inertia of the input-side dynamometer (hereinafter, also referred to as a "moment of inertia of a dynamometer") differs from a moment of inertia of the actual engine which is intended to be simulated thereby. More specifically, the moment of inertia of the dynamometer is larger than the moment of inertia of the actual engine. For this reason, in order to improve the reproducibility of tests, it is necessary to perform inertia-lowering control to control the input-side dynamometer such that the moment of inertia of the dynamometer becomes a set moment of inertia which is set to a value smaller than the moment of inertia of the dynamometer. Patent Document 3 illustrates a dynamometer control device for performing inertia-lowering control for the input-side dynamometer.

Patent Document 1: PCT International Publication No. WO2014/010409
Patent Document 2: Japanese Unexamined Patent Application, Publication No. 2013-257234
Patent Document 3: Japanese Unexamined Patent Application, Publication No. 2017-175378

DISCLOSURE OF THE INVENTION

Problems to be Solved by the Invention

Incidentally, the dynamometer control device of Patent Document 3 performs inertia-lowering control as described above based on a shaft torque detection signal transmitted from a shaft torque detector and a speed detection signal transmitted from a speed detector. Generally, however, the speed detection signal transmitted from the speed detector is slower in rising from 0 than the shaft torque detection signal transmitted from the shaft torque detector. Therefore, due to the delay of the speed detection signal, there is a case where a torque command signal, which is a control input to the input-side dynamometer, oscillates. As will be described later with reference to FIG. 8, the oscillation of such a torque command signal becomes remarkable in a low rotation range in which the delay of the speed detection signal is particularly large.

An object of the present invention is to provide a dynamometer control device that controls a dynamometer based on a shaft torque detection signal of a shaft torque detector and a speed detection signal of a speed detector having a larger delay than the shaft torque detection signal, and can suppress oscillation of a control input to the dynamometer in a low rotation range in which the delay becomes remarkable.

Means for Solving the Problems (1) A dynamometer control device according to the present invention (for example, an input-side control device 5, 5A to be described later) controls a test system (for example, a test system 1 to be described later) including: a dynamometer (for example, an input-side dynamometer 21 to be described later) coupled to an input shaft of a test piece (for example, a test piece W to be described later) provided with the input shaft (for example, an input shaft SI to be described later) and an output shaft (for example, output shafts SO1 and SO2); an inverter (for example, an input-side inverter 22 to be described later) that supplies electric power according to a torque command signal (for example, a torque command signal Tr to be described later) to the dynamometer; a speed detector (for example, an input-side speed detector 23 to be described later) that generates a speed detection signal (for example, an input-side speed detection signal w to be described later) according to a rotational speed of the dynamometer; and a shaft torque detector (for example, an input-side shaft torque detector 24 to be described later) that generates a shaft torque detection signal (for example, an input-side shaft torque detection signal Tsh to be described later) according to a shaft torque acting on the input shaft, and the dynamometer control device is configured to generate the torque command signal by using a higher order command signal of the torque command signal (for example, an engine torque command signal Tref to be described later), the speed detection signal, and the shaft torque detection signal. The dynamometer control device includes: a first input signal generating unit (for example, a first input signal generating unit 51 to be described later) that generates a first input signal based on a deviation between the higher order command signal and the shaft torque detection signal; a second input signal generating unit (for example, a second input signal generating unit 52, 52A to be described later) that generates a second input signal based on the speed detection signal weighted by a predetermined weight signal (for example, a weight signal w to be described later); and a torque command signal generating unit (for example, a torque command signal generating unit 54 to be described later) that generates the torque command signal based on the first input signal and the second input signal, in which the second input signal generating unit makes a value of the weight signal when a value of the speed detection signal or a filter value thereof is less than a threshold value (for example, a first threshold value $\omega 1$ or a second threshold value $\omega 2$ to be described later) smaller than a value of the weight signal when the value of the speed detection signal or the filter value thereof is equal to or greater than the threshold value, and the speed detection signal is slower in rising from 0 than the shaft torque detection signal.

(2) In this aspect, it is preferable that the speed detector is an incremental encoder that generates, as the speed detection signal, a pulse signal having a frequency according to an amount of rotational displacement when the output shaft of the dynamometer rotates.

(3) In this aspect, it is preferable that the second input signal generating unit (for example, a second input signal generating unit 52 to be described later) includes: a filter (for example, a second low-pass filter 521 to be described later) that attenuates high frequency components from the speed detection signal and causes low frequency components to pass therethrough; a weight setting section (for example, a weight setting section 522 to be described later) that outputs the weight signal having a value according to a value of an output signal of the filter (for example, a filter signal $\omega\_f$ to be described later); and a multiplier section (for example, a weight multiplier section 523 and a setting inertial multiplier section 524 to be described later) that generates the second input signal by multiplying the output signal of the filter by the weight signal and a predetermined set inertia (for example, a set inertia Jset to be described later).

(4) In this aspect, it is preferable that the weight setting section sets the value of the weight signal to 0 when the value of the output signal of the filter (for example, a filter signal $\omega\_f$ to be described later) is equal to or greater than 0 and less than a first threshold value (for example, a first threshold value $\omega 1$ to be described later), sets the value of the weight signal to 1 when the value of the output signal of the filter is equal to or greater than a second threshold value (a second threshold value $\omega 2$ to be described late) which is larger than the first threshold value, and sets the value of the weight signal to a value proportional to the value of the output signal of the filter between 0 and 1 when the value of the output signal of the filter is equal to or greater than the first threshold value and less than the second threshold value.

(5) In this aspect, it is preferable that the second input signal generating unit (for example, a second input signal generating unit 51A to be described later) includes: a first filter (for example, a second low-pass filter 521 to be described later) that attenuates high frequency components from the speed detection signal and causes low frequency components to pass therethrough; a weight setting section (for example, a weight setting section 522 to be described later) that outputs the weight signal having a value according to a value of the speed detection signal; a second filter (for example, a third low-pass filter 525A to be described later) that attenuates high frequency components from the weight signal and causes low frequency components to pass therethrough; and a multiplier section (for example, a weight multiplier section 523 and a setting inertial multiplier section 524 to be described later) that generates the second input signal by multiplying an output signal of the first filter by an output signal of the second filter and a predetermined set inertia (for example, a set inertia Jset to be described later).

(6) In this aspect, it is preferable that the second filter attenuates lower frequency components than the first filter attenuates.

(7) In this aspect, it is preferable that the weight setting section sets the value of the weight signal to 0 when the value of the speed detection signal (for example, an input-side speed detection signal $\omega$ to be described later) is equal to or greater than 0 and less than a first threshold value (for example, a first threshold value $\omega 1$ to be described later), sets the value of the weight signal to 1 when the value of the speed detection signal is equal to or greater than a second threshold value (for example, a second threshold value $\omega 2$ to be described later) which is larger than the first threshold value, and sets the value of the weight signal to a value proportional to the value of the speed detection signal between 0 and 1 when the value of the speed detection signal is equal to or greater than the first threshold value and less than the second threshold value.

Effects of the Invention (1) In the dynamometer control device according to the present invention, the first input signal generating unit generates a first input signal based on the deviation between the higher order command signal and the shaft torque detection signal, the second input signal generating unit generates a second input signal based on the speed detection signal weighted by a predetermined weight signal, and the torque command signal generating unit generates a torque command signal for the dynamometer based on the first input signal and the second input signal. Here, the speed detection signal transmitted from the speed detector to the second input signal generating unit is slower in rising from 0 than the shaft torque detection signal transmitted from the shaft torque detector to the first input signal generating unit. For this reason, as will be described later with reference to FIG. 8, in the conventional dynamometer control device, when the value of the higher order command signal is changed from 0 in a state in which the dynamometer is stationary and the shaft torque is also not acting, there is a case in which the value of the speed detection signal increases rapidly after a lapse of predetermined time after the value of the shaft torque detection signal starts to change. Therefore, in the conventional dynamometer control device, the torque command signal oscillates in the low rotation range, and thus there is a case in which the shaft torque detection signal also oscillates. In contrast, in the dynamometer control device according to the present invention, the second input signal generating unit makes the value of the weight signal when the value of the speed detection signal or the filter value is less than a predetermined threshold value (i.e., a case of the low rotation range) smaller than the value of the weight signal when the value of the speed detection signal or the filter value is equal to or greater than the threshold value (i.e., a case of the high rotation range). Thus, even when the value of the speed detection signal in the low rotation range rapidly increases, it is possible to suppress the torque command signal and the shaft torque detection signal from oscillating.

(2) In the dynamometer control device according to the present invention, as a speed detector for detecting the rotational speed of the dynamometer, an incremental encoder is used that generates, as a speed detection signal, a pulse signal having a frequency according to the amount of rotational displacement when the output shaft of the dynamometer rotates. The incremental encoder has the advantage of being inexpensive among known speed detectors such as absolute encoders and resolvers. However, in the incremental encoder, there is a problem in that, immediately after the rotation shaft of the dynamometer starts to rotate from a stationary state, since the number of pulses is insufficient, the delay at the time of rising from 0 becomes particularly remarkable. In contrast, according to the dynamometer control device of the present invention, by changing the value of the weight signal in accordance with the value of the speed detection signal or the filter value as described above, since the torque command signal and the shaft torque detection signal in the low rotation range can be suppressed from oscillating, disadvantages caused by using the incremental encoder as a speed detector will not be realized.

(3) In the dynamometer control device according to the present invention, the second input signal generating unit sets the value of the weight signal according to the filter value obtained by allowing the speed detection signal to pass through the filter, and multiplies the filter value of the speed detection signal by the value of the weight signal and the set inertia, thereby generating the second input signal. Thus, even when the value of the speed detection signal in the low rotation range rapidly increases, it is possible to suppress the torque command signal and the shaft torque detection signal from oscillating.

(4) In the dynamometer control device according to the present invention, the weight setting section sets the value of the weight signal to 0 when the filter value of the speed detection signal is equal to or greater than 0 and less than the first threshold value, sets the value of the weight signal to 1 when the filter value is equal to or greater than the second threshold value, and sets the value of the weight signal to a value proportional to the filter value between 0 and 1 when the filter value is equal to or greater than the first threshold value and less than the second threshold value. Thus, in the low rotation range in which the filter value of the speed detection signal is less than the second threshold, it is possible to appropriately change the value of the weight signal according to the filter value. Therefore, even when the value of the speed detection signal rapidly increases in the low rotation range, it is possible to suppress the torque command signal and the shaft torque detection signal from oscillating.

(5) In the dynamometer control device according to the present invention, the second input signal generating unit sets the value of the weight signal according to the value of the speed detection signal, and multiplies the filter value obtained by allowing the weight signal to pass through the second filter and a predetermined set inertia with the filter value obtained by allowing the speed detection signal to pass through the first filter, thereby generating the second input signal. Thus, even when the value of the speed detection signal in the low rotation range rapidly increases, it is possible to suppress the torque command signal and the shaft torque detection signal from oscillating. Furthermore, in the present invention, the second input signal generating unit can finely adjust the degree of change of the second input signal when the rotational speed of the dynamometer rises from 0 by using the two low-pass filters of the first filter and the second filter. Therefore, it is possible to suppress the oscillation of the torque command signal and the shaft torque detection signal further than the invention of (3) above.

(6) In the dynamometer control device according to the present invention, the second filter attenuates lower frequency components than the first filter attenuates. Thus, it is possible to further suppress the oscillation of the torque command signal and the shaft torque detection signal when the rotational speed of the dynamometer rises from 0.

(7) In the dynamometer control device according to the present invention, the weight setting section sets the value of the weight signal to 0 when the value of the speed detection signal is equal to or greater than 0 and less than the first threshold, sets the value of the weight signal to 1 when the value of the speed detection signal is equal to or greater than the second threshold, and sets the value of the weight signal to be proportional to the value of the speed detection signal between 0 and 1 when the value of the speed detection signal is equal to or greater than the first threshold and less than the second threshold. Thus, in the low rotation range in which the value of the speed detection signal is less than the second threshold value, it is possible to appropriately change the value of the weight signal according to the value of the speed detection signal. Therefore, even when the value of the speed detection signal is rapidly changed in the low rotation range, it is possible to suppress the torque command signal and the shaft torque detection signal from oscillating.

PREFERRED MODE FOR CARRYING OUT THE INVENTION

First Embodiment

Figure 1:
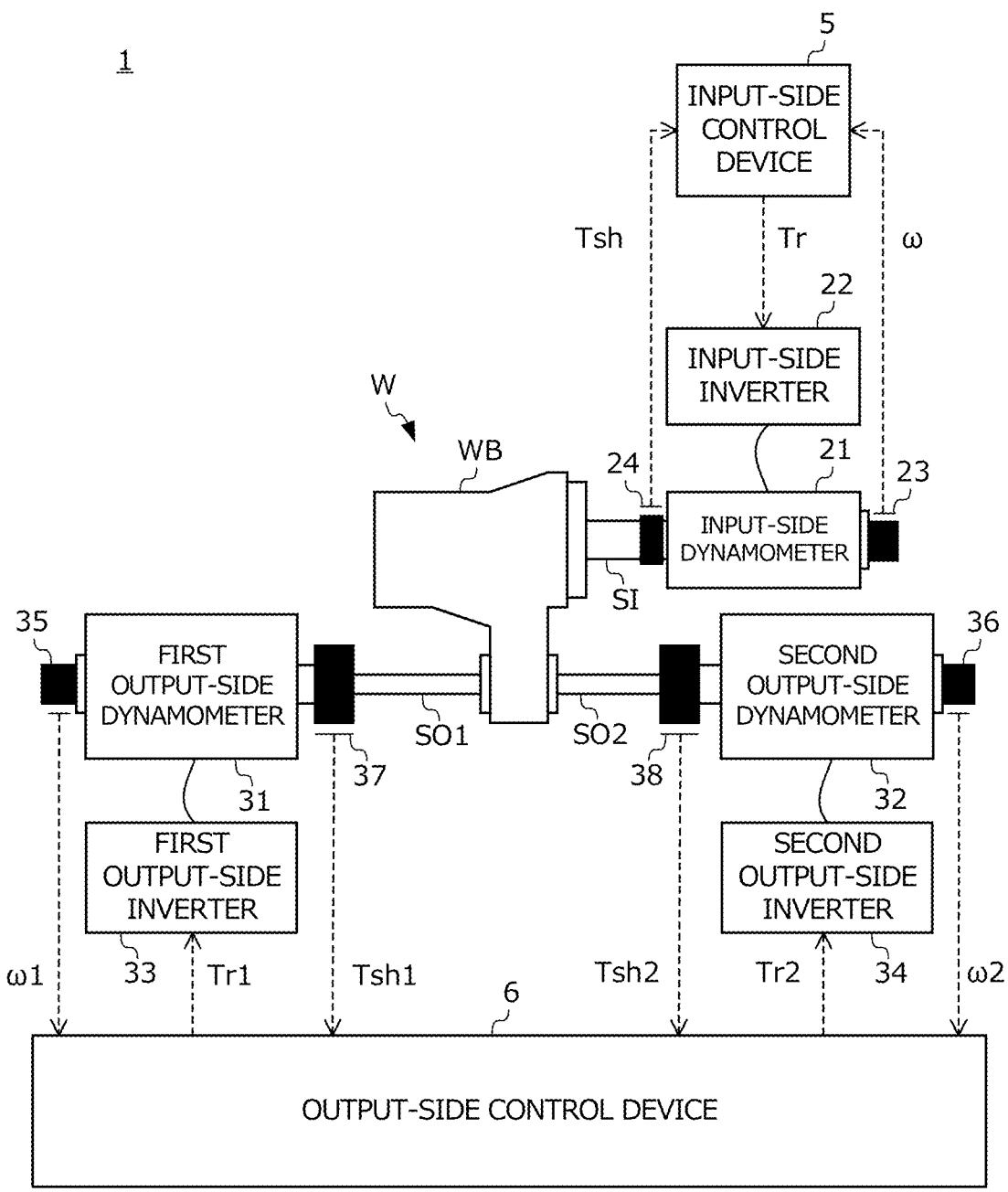
FIG. 1 is a diagram showing a configuration of a test system of a drivetrain to which an input-side control device according to a first embodiment of the present invention is applied.

Hereinafter, a first embodiment of the present invention will be described in detail with reference to the drawings. FIG. 1 is a diagram showing the configuration of a test system 1 for a drivetrain to which an input-side control device 5 according to the present embodiment is applied. It should be noted that FIG. 1 shows an example of the test system 1 including the drivetrain of a FF drive vehicle as a test piece W; however, the present invention is not limited thereto. The test piece may be, for example, the drivetrain of a FR drive vehicle.

The test piece W is a combination of an input shaft SI which is connected to an engine (not shown in a state where the test piece W is mounted in a completed vehicle), right and left output shafts SO1 and SO2 which are drive shafts, a clutch, a transmission, differential gears, and the like, and includes a main body WB which transmits power inputted from the input shaft SI to the output shafts SO1 and SO2.

The test system 1 includes an input-side dynamometer 21, an input-side inverter 22, an input-side speed detector 23, an input-side shaft torque detector 24, a first output-side dynamometer 31, a second output-side dynamometer 32, a first output-side inverter 33, a second output-side inverter 34, a first output-side speed detector 35, a second output-side speed detector 36, a first output-side shaft torque detector 37, a second output-side shaft torque detector 38, an input-side control device 5, and an output-side control device 6.

An output shaft of the input-side dynamometer 21 is coupled to the input shaft SI of the test piece W. When an input-side torque command signal Tr which is generated by a procedure to be described later is inputted to the input-side inverter 22 from the input-side control device 5, the input-side inverter 22 supplies electrical power according to the input-side torque command signal Tr to the input-side dynamometer 21.

The input-side shaft torque detector 24 detects the shaft torque acting on the input shaft SI from, for example, the amount of distortion in the torsional direction of the shaft, and generates an input-side shaft torque detection signal Tsh according to the shaft torque. The input-side shaft torque detection signal Tsh is inputted to the input-side control device 5. It should be noted that, in the present embodiment, as the input-side shaft torque detector 24, a case of using a shaft torque sensor that detects a shaft torque by using a strain gauge will be described. However, the present invention is not limited thereto.

The input-side speed detector 23 detects the rotational speed (the number of revolutions of the shaft per unit time) of the output shaft of the input-side dynamometer 21, and generates an input-side speed detection signal w according to the rotational speed. The input-side speed detection signal w is inputted to the input-side control device 5. As will be described later with reference to FIG. 8, the input-side speed detection signal w outputted from the input-side speed detector 23 is slower in rising from 0 than the input-side shaft torque detection signal Tsh outputted from the input-side shaft torque detector 24 described above.

In the present embodiment, as the input-side speed detector 23, a case of using an incremental encoder that generates, as the input-side speed detection signal w, a pulse signal having a frequency according to the amount of rotational displacement when the output shaft of the input-side dynamometer 21 rotates will be described. The pulse signal generated in the incremental encoder includes A phase, B phase, and Z phase. A phase is a reference output, and generates pulses by the number of resolutions in one rotation of the output shaft. B phase generates the same number of pulses as A phase at a predetermined phase difference (for example, 90°) relative to A phase. By using these A phase and B phase pulse signals, it is possible to detect the rotational direction of the output shaft of the input-side dynamometer 21. Furthermore, Z phase is intended to be the origin reference output, and generates a pulse when the output shaft reaches a predetermined reference position. When an incremental encoder is used as the input-side speed detector 23, the delay at the time of rising from 0 as described above becomes remarkable. It should be noted that, in the present embodiment, a case in which an incremental encoder is used as the input-side speed detector 23 will be described. However, the present invention is not limited thereto. The input-side speed detector 23 is acceptable as long as the input-side speed detection signal G) as described above is slower in rising from 0 than the input-side shaft torque detection signal Tsh, and therefore, an absolute encoder, a resolver, or the like may be used.

An output shaft of the first output-side dynamometer 31 is coupled to the output shaft SO1 of the test piece W. When a first output-side torque command signal Tr1 which is generated by a procedure to be described later is inputted to the first output-side inverter 33 from the output-side control device 6, the first output-side inverter 33 supplies electrical power according to the first output-side torque command signal Tr1 to the first output-side dynamometer 31. The first output-side speed detector 35 detects the rotational speed of the output shaft of the first output-side dynamometer 31, and generates a first output-side speed detection signal ω1 according to the rotational speed. The first output-side speed detection signal ω1 is inputted to the output-side control device 6. The first output-side shaft torque detector 37 detects the shaft torque acting on the output shaft SO1 from, for example, the amount of distortion in the torsional direction of the shaft, and generates a first output-side shaft torque detection signal Tsh1 according to the shaft torque. The first output-side shaft torque detection signal Tsh1 is inputted to the output-side control device 6.

An output shaft of the second output-side dynamometer 32 is coupled to the output shaft SO2 of the test piece W. When a second output-side torque command signal Tr2 which is generated by a procedure to be described later is inputted to the second output-side inverter 34 from the output-side control device 6, the second output-side inverter 34 supplies electrical power according to the second output-side torque command signal Tr2 to the second output-side dynamometer 32. The second output-side speed detector 36 detects the rotational speed of the output shaft of the second output-side dynamometer 32, and generates a second output-side speed detection signal ω2 according to the rotational speed. The second output-side speed detection signal ω2 is inputted to the output-side control device 6. The second output-side shaft torque detector 38 detects the shaft torque acting on the output shaft SO2 from, for example, the amount of distortion in the torsional direction of the shaft, and generates a second output-side shaft torque detection signal Tsh2 according to the shaft torque. The second output-side shaft torque detection signal Tsh2 is inputted to the output-side control device 6.

The input-side control device 5 generates the input-side torque command signal Tr according to a procedure which is to be described later with reference to FIG. 4, etc., by using input signals such as the input-side speed detection signal w and the input-side shaft torque detection signal Tsh, and inputs the input-side torque command signal Tr to the input-side inverter 22. Therefore, the input-side control device 5 causes the input-side dynamometer 21 to generate a drive torque which simulates the engine of the completed vehicle in which the test piece W is mounted, and drives the input shaft SI of the test piece W.

The output-side control device 6 generates the first output-side torque command signal Tr1 and the second output-side torque command signal Tr2 according to a procedure which is to be described later with reference to FIGS. 2, 3, etc. by using input signals such as the first output-side speed detection signal ω1, the second output-side speed detection signal ω2, the first output-side shaft torque detection signal Tsh1, and the second output-side shaft torque detection signal Tsh2, and inputs the first output-side torque command signal Tr1 and the second output-side torque command signal Tr2 to the first output-side inverter 33 and the second output-side inverter 34. Therefore, the output-side control device 6 applies a load, which simulates the tire inertia or vehicle body inertia of the completed vehicle in which the test piece W is mounted, to the output shafts SO1 and SO2 of the test piece W.

The test system 1 evaluates the durability, quality, and the like of the test piece W under a condition close to the actual vehicle traveling condition by causing the input-side control device 5 to drive the input shaft SI of the test piece W and at the same time, causing the output-side control device 6 to apply the load which simulates the tire inertia or vehicle body inertia to the output shafts SO1 and SO2 of the test piece W.

Figure 2:
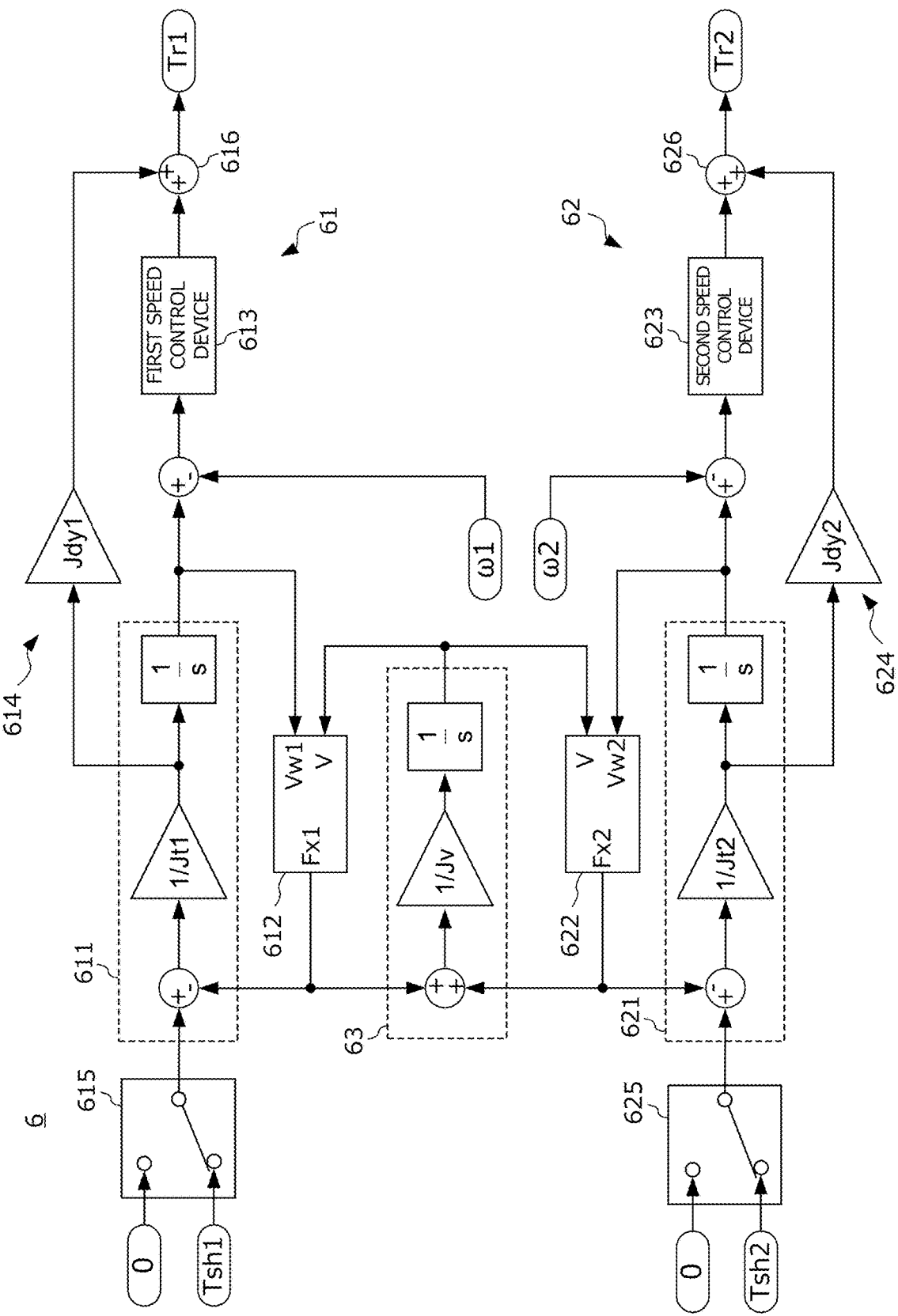
FIG. 2 is a block diagram showing a configuration of a control circuit of an output-side control device.
Figure 3:
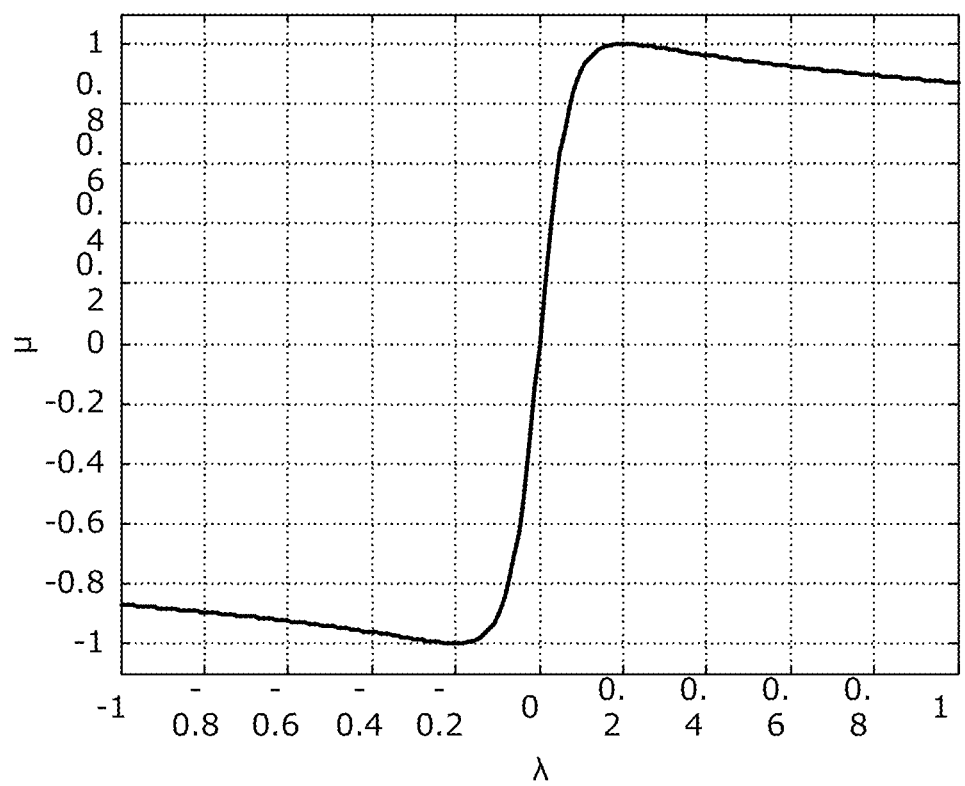
FIG. 3 is an example of a control map for determining a friction coefficient value.

FIG. 2 is a block diagram showing the configuration of a control circuit of the output-side control device 6. The output-side control device 6 includes a first control circuit 61 that generates the first output-side torque command signal Tr1 based on the first output-side speed detection signal $\omega 1$ and the first output-side shaft torque detection signal Tsh1; a second control circuit 62 that generates the second output-side torque command signal Tr2 based on the second output-side speed detection signal $\omega 2$ and the second output-side shaft torque detection signal Tsh2; and a vehicle speed calculation unit 63 that calculates the speed of a virtual vehicle in which the test piece W is mounted.

The first control circuit 61 includes a first tire speed calculation section 611; a first vehicle drive torque calculation section 612; a first speed control device 613; a first feed-forward input calculation section 614; a first shaft torque input selector 615; and a first synthesis section 616. The second control circuit 62 includes a second tire speed calculation section 621; a second vehicle drive torque calculation section 622; a second speed control device 623; a second feed-forward input calculation section 624; a second shaft torque input selector 625; and a second synthesis section 626.

The vehicle speed calculation unit 63 generates a vehicle speed signal V according to the speed of the vehicle by the equation of motion of the vehicle (refer to the following equation (1)) that has, as inputs, a first vehicle drive torque signal Fx1 (to be described later) which corresponds to a vehicle drive force occurring due to a frictional force between a first virtual tire and a first virtual road surface and a second vehicle drive torque signal Fx2 (to be described later) which corresponds to a vehicle drive force occurring due to a frictional force between a second virtual tire and a second virtual road surface, and is characterized by a moment of inertia Jv of the virtual vehicle which travels using the first and second tires as drive wheels.

$$Fx1 + Fx2 = Jv \cdot \frac{dV}{dt} \qquad (1)$$

More specifically, the vehicle speed calculation unit 63 generates the vehicle speed signal V by multiplying a signal, which is the sum of the first vehicle drive torque signal Fx1 generated by the first vehicle drive torque calculation section 612 and the second vehicle drive torque signal Fx2 generated by the second vehicle drive torque calculation section 622, by the reciprocal of the moment of inertia Jv of the vehicle, and performing an integral operation on the multiplication result.

The first shaft torque input selector 615 selectively switches an input to the first tire speed calculation section 611 between the first output-side shaft torque detection signal Tsh1 and a signal with a value of zero. As the input to the first tire speed calculation section 611, the first shaft torque input selector 615 normally sets the first output-side shaft torque detection signal Tsh1, and sets the signal with a value of zero when a stall test is performed.

The first tire speed calculation section 611 generates a first tire speed signal Vw1 according to the rotational speed of the first tire by the equation of motion of the first tire (refer to the following equation (2)) that has, as inputs, the first output-side shaft torque detection signal Tsh1 and the first vehicle drive torque signal Fx1, and is characterized by a moment of inertia Jt1 of the first tire.

$$Tsh1 - Fx1 = Jt1 \cdot \frac{dVw1}{dt} \qquad (2)$$

More specifically, the first tire speed calculation section 611 generates the first tire speed signal Vw1 by defining a signal, which is obtained by subtracting the first vehicle drive torque signal Fx1 from the first output-side shaft torque detection signal Tsh1, as a first tire drive torque signal which contributes to the rotation of the first tire, multiplying the first tire drive torque signal by the reciprocal of the moment of inertia Jt1 of the first tire, and performing an integral operation on the multiplication result.

The second shaft torque input selector 625 selectively switches an input to the second tire speed calculation section 621 between the second output-side shaft torque detection signal Tsh2 and a signal with a value of zero. As the input to the second tire speed calculation section 621, the second shaft torque input selector 625 normally sets the second output-side shaft torque detection signal Tsh2, and sets the signal with a value of zero when a stall test is performed.

The second tire speed calculation section 621 generates a second tire speed signal Vw2 according to the rotational speed of the second tire by the equation of motion of the second tire (refer to the following equation (3)) that has, as inputs, the second output-side shaft torque detection signal Tsh2 and the second vehicle drive torque signal Fx2, and is characterized by a moment of inertia Jt2 of the second tire. Since the specific procedure of calculating the second tire speed signal Vw2 is the same as the procedure of calculating the first tire speed signal Vw1, a detailed description thereof will be omitted.

$$Tsh2 - Fx2 = Jt2 \cdot \frac{dVw2}{dt} \qquad (3)$$

The first vehicle drive torque calculation section 612 generates the first vehicle drive torque signal Fx1 which corresponds to the vehicle drive force occurring due to the frictional force between the first tire and the first road surface which is virtually set, based on a difference between the first tire speed signal Vw1 and the vehicle speed signal V. Hereinafter, the procedure will be specifically described.

Firstly, the first vehicle drive torque calculation section 612 calculates a first slip rate $\lambda 1$ of the first tire on the first road surface by the following equation (4-1) based on the speed difference (Vw1-V) and the larger one of the speed signals Vw1 and V. Next, the first vehicle drive torque calculation section 612 determines a first coefficient value $\mu 1$ of friction between the first tire and the first road surface based on a control map f1 shown in FIG. 3, which has the calculated first slip rate $\lambda 1$ as an argument (refer to the following equation (4-2)). It should be noted that a control map that determines the coefficient value of friction can be appropriately selected depending on the condition (a snowy surface, a dry road surface, or the like) of the first road surface. Next, the first vehicle drive torque calculation section 612 generates the first vehicle drive torque signal Fx1 by multiplying a first normal force value Nz1, which the first tire receives from the first road surface, by the first coefficient value μ1 of friction (refer to the following equation (4-3)). A constant which is determined in advance or a value which is estimated depending on the vehicle speed signal V or the like is used as the first normal force value Nz1.

$$\lambda 1 = \frac{Vw1 - V}{\max(Vw1, V)} \quad (4-1)$$

$$\mu 1 = f1(\lambda 1) \quad (4-2)$$

$$Fx1 = Nz1 \cdot \mu 1 \quad (4-3)$$

The second vehicle drive torque calculation section 622 generates the second vehicle drive torque signal Fx2 which corresponds to the vehicle drive force occurring due to the frictional force between the second tire and the second road surface, based on the following equations (5-1) to (5-3) that have, as inputs, the second tire speed signal Vw2 and the vehicle speed signal V. Since the specific procedure of generating the second vehicle drive torque signal Fx2 is the same as the procedure of generating the first vehicle drive torque signal Fx1, a detailed description thereof will be omitted.

$$\lambda 2 = \frac{Vw2 - V}{\max(Vw2, V)} \quad (5-1)$$

$$\mu 2 = f2(\lambda 2) \quad (5-2)$$

$$Fx2 = Nz2 \cdot \mu 2 \quad (5-3)$$

As described above, the first control circuit 61 and the second control circuit 62 generate the vehicle speed signal V, the first tire speed signal Vw1, and the second tire speed signal Vw2 by virtually setting the first tire and the second tire which are connected to the output shafts SO1 and SO2 of the test piece W and the vehicle which travels on the first road surface and the second road surface using these tires as drive wheels, assuming these tires and the vehicle as independent objects having the moments of inertia Jt1, Jt2, and Jv, and then simultaneously solving the equations of motion (1), (2), (3), (4-1) to (4-3), and (5-1) to (5-3) for these tires and the vehicle.

The first speed control device 613 generates a first feedback control input signal for eliminating a deviation between the first tire speed signal Vw1 and the first output-side speed detection signal ω1. The second speed control device 623 generates a second feedback control input signal for eliminating a deviation between the second tire speed signal Vw2 and the second output-side speed detection signal ω2.

The first feed-forward input calculation section 614 generates a first feed-forward control input signal by multiplying the difference between the first output-side shaft torque detection signal Tsh1 and the first vehicle drive torque signal Fx1 by a coefficient that is obtained by dividing a moment of inertia Jdy1 of the first output-side dynamometer 31 by the moment of inertia Jt1 of the first tire. The first synthesis section 616 generates the first output-side torque command signal Tr1 by adding the first feedback control input signal generated by the first speed control device 613 and the first feed-forward control input signal generated by the first feed-forward input calculation section 614.

The second feed-forward input calculation section 624 generates a second feed-forward control input signal by multiplying the difference between the second output-side shaft torque detection signal Tsh2 and the second vehicle drive torque signal Fx2 by a coefficient that is obtained by dividing a moment of inertia Jdy2 of the second output-side dynamometer 32 by the moment of inertia Jt2 of the second tire. The second synthesis section 626 generates the second output-side torque command signal Tr2 by adding the second feedback control input signal generated by the second speed control device 623 and the second feed-forward control input signal generated by the second feed-forward input calculation section 624.

Figure 4:
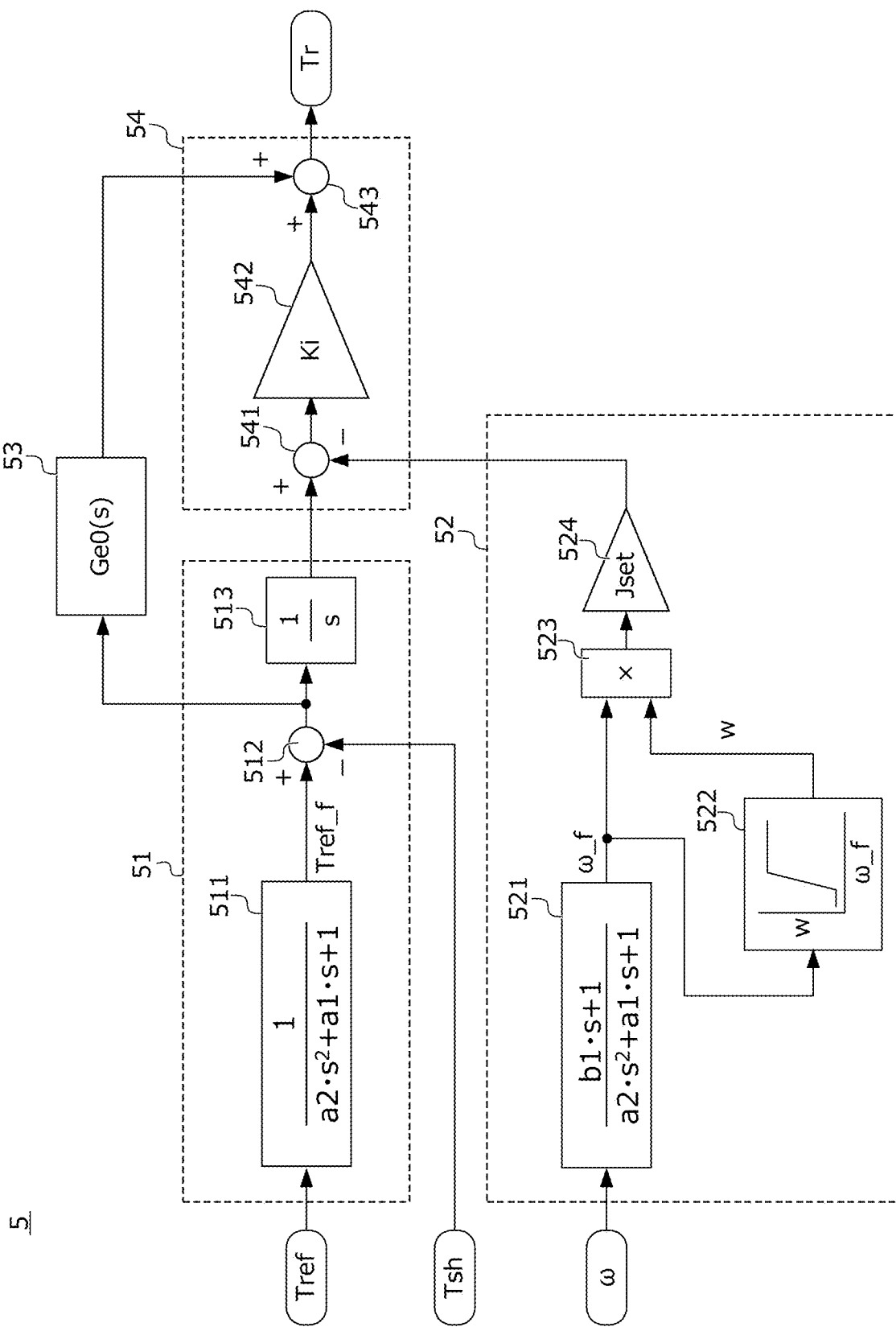
FIG. 4 is a diagram showing the configuration of a control circuit of the input-side control device.

FIG. 4 is a block diagram showing the configuration of a control circuit of the input-side control device 5. FIG. 4 particularly shows a portion of the control circuit included in the input-side control device 5, the portion being responsible for the electrical inertia control of the input-side dynamometer.

The input-side control device 5 includes a first input signal generating unit 51, a second input signal generating unit 52, a third input signal generating unit 53, and a torque command signal generating unit 54, and generates an input-side torque command signal Tr by using these components.

The first input signal generating unit 51 generates a first input signal according to a procedure to be described later, based on the deviation between an engine torque command signal Tref, which is a higher order command signal for the input-side torque command signal Tr, and an input-side shaft torque detection signal Tsh. The second input signal generating unit 52 generates a second input signal according to a procedure to be described later, based on the input-side speed detection signal ω. The third input signal generating unit 53 generates a third input signal according to a procedure to be described later, based on the deviation between the engine torque command signal Tref and the input-side shaft torque detection signal Tsh. The torque command signal generating unit 54 generates an input-side torque command signal Tr according to a procedure to be described later based on the first to third input signals generated by the input signal generating units 51 to 53, and inputs the input-side torque command signal Tr to the input-side inverter 22.

The first input signal generating unit 51 includes a first low-pass filter 511, a deviation calculation section 512, and an integral calculation section 513.

The first low-pass filter 511 attenuates the high-frequency components from the engine torque command signal Tref and causes the low-frequency components to pass therethrough. In the following, the output signal of the first low-pass filter 511, i.e., the filter signal obtained by allowing the engine torque command signal Tref to pass through the first low-pass filter 511 and attenuating the high-frequency components, is referred to as Tref_f. The filter signal Tref_f of the engine torque command signal Tref is inputted to the deviation calculation section 512. The transfer function GLPF(s) of the first low-pass filter 511 is characterized by two filter coefficients a1 and a2 as shown in Equation (6) below. As shown in Equation (6) below, the degree of the denominator polynomial of the transfer function GLPF1(s) of the first low-pass filter 511 is 2 and the degree of the numerator polynomial is 0. It should be noted that the procedure for setting the values of the two filter coefficients a1 and a2 characterizing the input/output characteristics of the first low-pass filter 511 will be described in detail later.

$$GLPF1(s) = \frac{1}{a2 \cdot s^2 + a1 \cdot s + 1} \quad (6)$$

The deviation calculation section 512 calculates a deviation by subtracting the input-side shaft torque detection signal Tsh from the filter signal Tref_f of the engine torque command signal Tref, and inputs the deviation to the integral calculation section 513 and the third input signal generating unit 53.

The integral calculation section 513 generates a first input signal by integrating the deviation calculated by the deviation calculation section 512, and inputs the first input signal to the torque command signal generating unit 54.

The third input signal generation unit 53 generates a third input signal by performing a non-integral operation using the transfer function Ge0(s) to the deviation calculated by the deviation calculation section 512, and inputs the third input signal to the torque command signal generating unit 54. Here, a description will be given of a procedure for designing the transfer function Ge0(s) of the third input signal generating unit 53.

Figure 5:
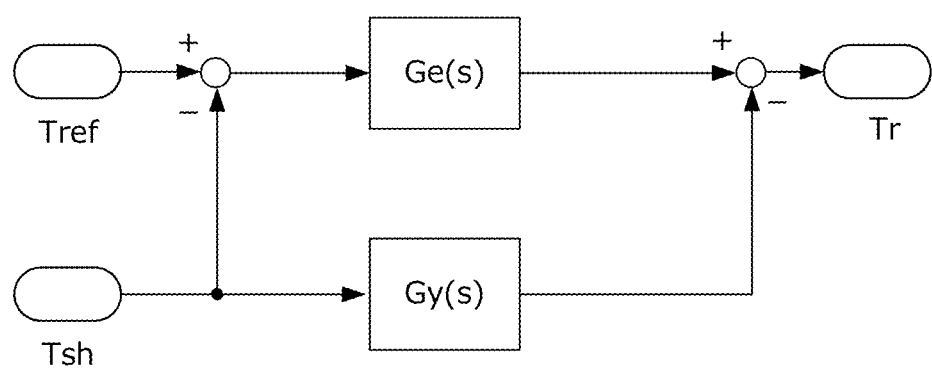
FIG. 5 is a diagram showing the configuration of a controller used in deriving the transfer functions Ge0(s)

FIG. 5 is a diagram showing the configuration of a controller C used in deriving the transfer function Ge0(s). The controller C of FIG. 5 has a shaft torque control function for generating an input-side torque command signal Tr such that the deviation (Tref-Tsh, hereinafter simply referred to as torque deviation) is eliminated when the input-side shaft torque detection signal and the engine torque command signal Tref are inputted. The transfer function Ge0(s) of the third input signal generating unit 53 is designed based on the controller C having two degrees of freedom shown in FIG. 5. As the controller C having two degrees of freedom and the transfer functions Ge(s) and Gy(s) constituting the controller C having such a shaft torque control function, for example, the controller disclosed in the embodiment of FIG. 6 of Japanese Patent No. 3775284 by the applicant of the present application is used. It should be noted that the method of designing the controller C having two degrees of freedom and the transfer functions Ge(s) and Gy(s) constituting the controller C having such a shaft torque control function is not limited to the method based on the μ design method disclosed in, for example, Japanese Patent No. 3775284. For example, in addition to μ synthesis, a method may be used that is designed based on other robust control design methods such as $H^\infty$ control design method.

With reference to FIG. 4 again, for the transfer function Ge0(s) of the third input signal generating unit 53, a function obtained by separating the integrator of the integral gain Ki as shown in the following Equation (7) from the transfer function Ge(s) having a shaft torque control function as described above can be used.

$$Ge(s) = \frac{Ki}{s} + Ge0(s) \quad (7)$$

The torque command signal generating unit 54 includes a subtraction section 541, a control gain multiplier section 542, and a summing section 543.

The subtraction section 541 inputs, to the control gain multiplier section 542, the signal obtained by subtracting the second input signal generated by the second input signal generating unit 52 from the first input signal generated by the first input signal generating unit 51. The control gain multiplier section 542 inputs, to the summing section 543, the signal obtained by multiplying the output signal of the subtraction section 541 by a predetermined integral gain Ki. The summing section 543 generates an input-side torque command signal Tr by summing an output signal of the control gain multiplier section 542 and the third input signal generated by the third input signal generating unit 53, and inputs the input-side torque command signal Tr to the input-side inverter 22.

As described above, the torque command signal generating unit 54 generates the input-side torque command signal Tr based on a first input signal generated by the first input signal generating unit 51, a second input signal generated by the second input signal generating unit 52, and a third input signal generated by the third input signal generating unit 53.

Here, an effect by generating the input-side torque command signal Tr based on the third input signal will be described.

Figure 6:
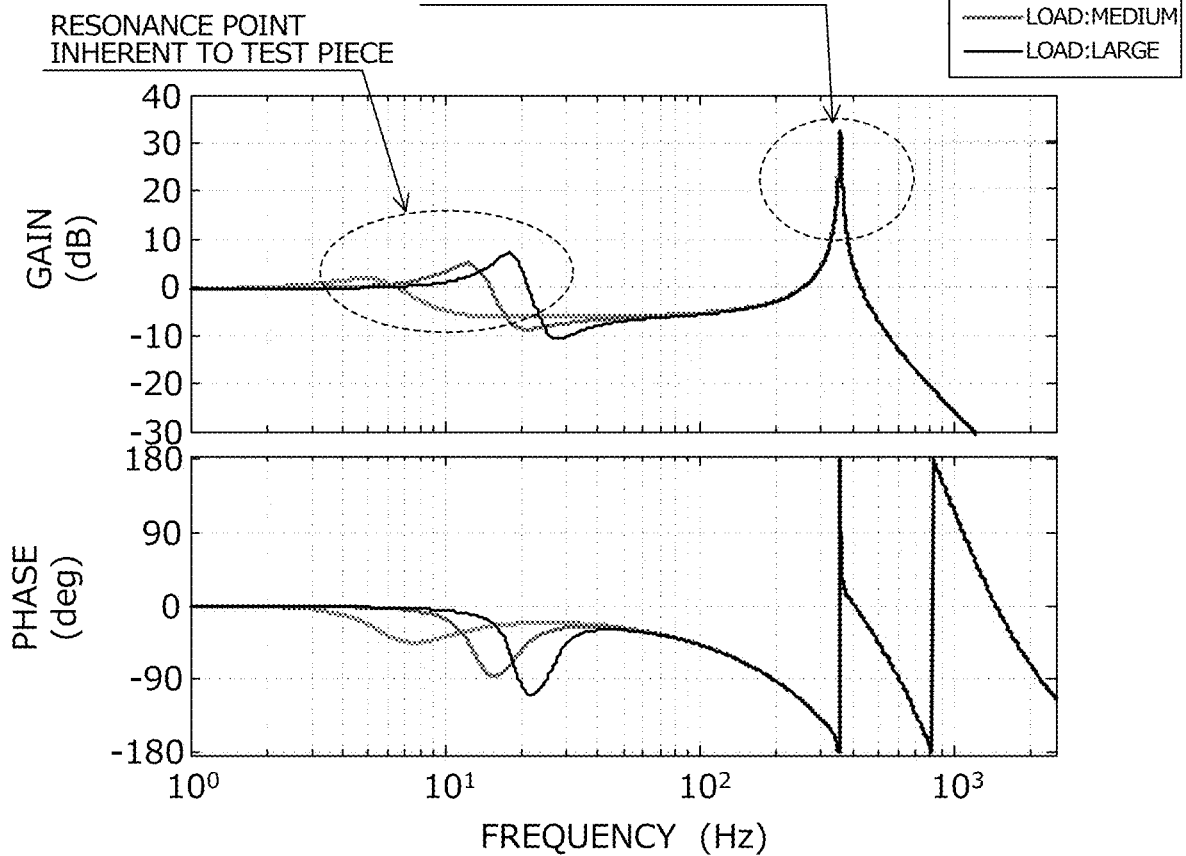
FIG. 6 is a Bode diagram showing the response characteristics from an input-side torque command signal to an input-side shaft torque detection signal.

FIG. 6 is a Bode diagram showing the response characteristics from the input-side torque command signal Tr to the input-side shaft torque detection signal Tsh. FIG. 6 shows a case in which the magnitudes of the loads generated by the output-side dynamometers 31 and 32 are varied by separating them into three stages: small, medium, and large, using different types of lines. As shown in FIG. 6, in the test system 1 in which the input-side dynamometer 21 is connected to the input shaft SI of the test piece W and the output-side dynamometers 31 and 32 are connected to the output shafts SO1 and SO2 of the test piece W, there are two types of resonance points: resonance occurring at a relatively low frequency side (fl=several Hz to several tens of Hz) and resonance occurring at a relatively high frequency side (fh=about 400 Hz). The resonance occurring at the resonance frequency fl on the relatively low frequency side is a phenomenon inherent to the test piece W, and the resonance occurring at the resonance frequency fh on the relatively high frequency side is a phenomenon occurring due to the torsional vibration of the input shaft SI of relatively high rigidity. The input-side control device 5 configured as described above generates an input-side torque command signal Tr using the third input signal generated by the third input signal generating unit 53, such that the input-side control device 5 includes the resonance suppressing function of suppressing the resonance appearing at the resonance frequency fh on the relatively high frequency side among the plurality of resonance points as described above.

With reference to FIG. 4 again, the second input signal generating unit 52 includes a second low-pass filter 521, a weight setting section 522, a weight multiplier section 523, and a setting inertial multiplier section 524.

The second low-pass filter 521 attenuates the high-frequency components from the input-side speed detection signal ω and allows the low-frequency components to pass therethrough. In the following, the output signal of the second low-pass filter 521, i.e., the filter signal obtained by allowing the input-side speed detection signal ω to pass through the second low-pass filter 521 and attenuating the high-frequency components is referred to as ω_f. The filter signal ω_f of the input-side speed detection signal ω is inputted to the weight setting section 522 and the weight multiplier section 523. The transfer function GLPF2(s) of the second low-pass filter 521 is characterized by three filter coefficients a1, a2, and b1 as shown in Equation (8) below. As shown in Equation (8) below, the degree of the denominator polynomial of the transfer function GLPF2(s) of the second low-pass filter 521 is 2, and the function type is the same as the denominator polynomial of the transfer function GLPF1(s) of the first low-pass filter 511. Furthermore, the degree of the numerator polynomial of the transfer functional GLPF2 (s) of the second low-pass filter 521 is 1. That is, the degree of the numerator polynomial of the transfer function GLPF2(s) of the second low-pass filter 521 is larger than the degree of the numerator polynomial of the transfer function GLPF1(s) of the first low-pass filter 511. It should be noted that the procedure for setting the values of the three filter coefficients a1, a2, and b1 characterizing the input/output characteristics of the second low-pass filter 521 will be described in detail later.

$$GLPF2 = \frac{b1 \cdot s + 1}{a2 \cdot s^2 + a1 \cdot s + 1} \quad (8)$$

The weight setting section 522 generates a weight signal w set to a value between 0 and 1 in accordance with the filter signal $\omega\_f$ of the input-side speed detection signal $\omega$, and outputs the weight signal w to the weight multiplier section 523. More specifically, the weight setting section 522 includes a control map associating the value of the filter signal $\omega\_f$ with the value of the weight signal w, and sets the value of the weight signal w by searching the control map based on the value of the filter signal $\omega\_f$.

Figure 7:
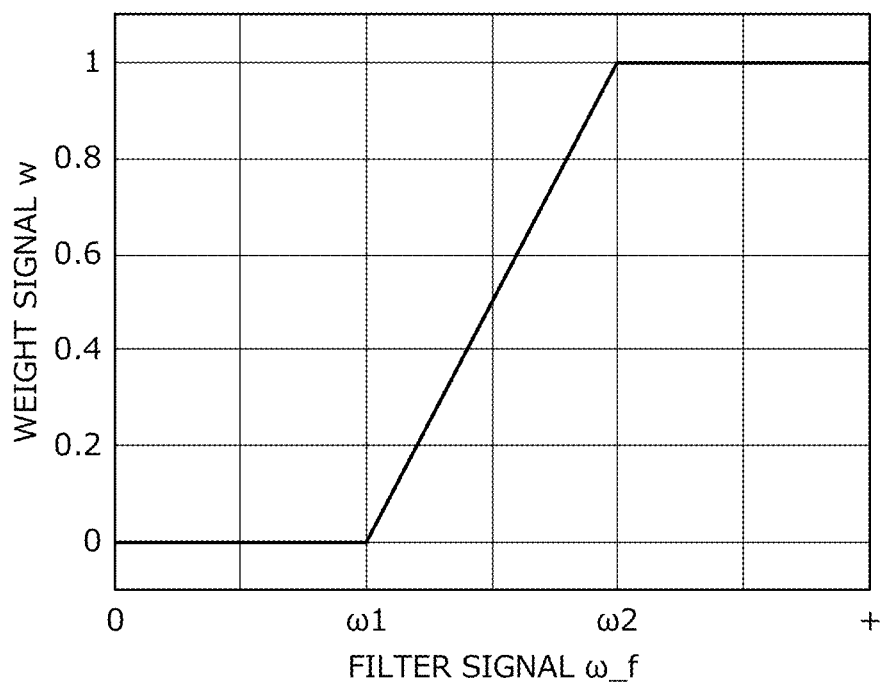
FIG. 7 is an example of a control map that determines the value of a weight signal.

FIG. 7 is an example of a control map for determining the value of the weight signal $\omega$. As shown in FIG. 7, in the weight setting section 522, when the value of the filter signal $\omega\_f$ is equal to or greater than 0, and less than the predetermined first threshold $\omega1$, the value of the weight signal w is set to 0, which is the minimum value; when the value of the filter signal $\omega\_f$ is not less than the second threshold $\omega2$ which is larger than the first threshold $\omega1$, the value of the weight signal w is set to 1, which is the maximum value; and when the value of the filter signal $\omega\_f$ is equal to or greater than the first threshold $\omega1$, and less than the second threshold $\omega2$, the value of the weight signal w is set to a value proportional to the value of the filter signal $\omega\_f$ between 0 and 1. In other words, in the weight setting section 522, when the value of the filter signal $\omega\_f$ is less than the first threshold $\omega1$, the value of the weight signal w is made smaller than when the value of the filter signal $\omega\_f$ is equal to or greater than the first threshold $\omega1$. Furthermore, when the value of the filter signal $\omega\_f$ is less than the second threshold $\omega2$, the weight setting section 522 makes the value of the weight signal w smaller than when the value of the filter signal $\omega\_f$ is equal to or greater than the second threshold $\omega2$. It should be noted that a specific setting example of the first threshold value $\omega1$ and the second threshold value $\omega2$ will be described later in conjunction with a description of the effect by weighting with the weight signal $\omega$.

In addition, in the present embodiment, a case will be described in which the value of the weight signal w is set based on the value of the filter signal $\omega\_f$ as described above; however, the present invention is not limited thereto. The value of the weight signal w may be set based on a parameter proportional to the rotational speed of the output shaft of the input-side dynamometer 21. For example, the value of the weight signal w may be set based on the value of the input-side speed detection signal $\omega$ before passing through the second low-pass filter 521.

The weight multiplier section 523 outputs a result obtained by multiplying the filter signal $\omega\_f$ by the weight signal w, to the setting inertial multiplier section 524. The setting inertial multiplier section 524 generates a second input signal by multiplying the output signal of the weight multiplier section 523 by a predetermined set inertia Jset, and inputs the second input signal to the torque command signal generating unit 54. This set inertia Jset is a moment of inertia to be realized by the input-side dynamometer 21 by electrical inertia control. When mounted on a completed vehicle, the set inertia Jset is set to the moment of inertia of the engine connected to the input shaft SI of the test piece W. This set inertia Jset is, for example, set to a smaller value than the actual moment of inertia of the input-side dynamometer 21.

As described above, the second input signal generating unit 52 generates the second input signal by weighting the filter signal $\omega\_f$ of the input-side speed detection signal $\omega$ by the weight signal w set to a value between 0 and 1 and the set inertia Jset.

Thus, in the second input signal generating unit 52, the weight signal w is multiplied by the input-side speed detection signal $\omega$ which is a parameter proportional to the rotational speed of the output shaft of the input-side dynamometer 21, or its filter signal $\omega\_f$, and the set inertia Jset which is the moment of inertia to be realized by the input-side dynamometer 21 by electrical inertia control. Therefore, changing the value of the weight signal w according to the input-side speed detection signal $\omega$ or its filter signal $\omega\_f$ is equivalent to changing the value of the set inertia Jset according to the input-side speed detection signal $\omega$ or its filter signal $\omega\_f$. Therefore, setting the value of the weight signal w according to the procedure described with reference to FIG. 7 is equivalent to reducing the value of the set inertia Jset as the input-side speed detection signal $\omega$ or the filter signal $\omega\_f$ decreases, in other words, lightening the moment of inertia to be realized by the input-side dynamometer 21 by the electric inertia control as the delay of the input-side speed detector 23 becomes greater. Therefore, the same effect can be achieved even when the second input signal generating unit 52 does not define the weight signal w as described above, for example, generates the second input signal by multiplying the filter signal $\omega\_f$ of the input-side speed detection signal $\omega$ only by the set inertia Jset, and changes the set inertia Jset by the value of the filter signal $\omega\_f$ (or the input-side speed detection signal $\omega$).

Next, a procedure for setting the filter coefficients a1, a2, and b1 characterizing the input/output characteristics of the first low-pass filter 511 and the second low-pass filter 521 will be described.

These three filter coefficients a1, a2, and b1 are set to be the following polynomial Pc(s) in which the characteristic polynomial of the closed-loop transfer function of the control circuit constituted by the three input signal generating units 51, 52, and 53 and the torque command signal generating unit 54 is characterized by a predetermined response frequency fc and a predetermined coefficient c1, c2, and c3. Here, the response frequency fc is defined to be sufficiently lower than the resonance frequency fh of the input shaft SI. More specifically, when the resonance frequency fh is about 400 Hz, the response frequency fc is set to, for example, about 100 Hz. Furthermore, the specific values of the coefficients c1, c2, and c3 are set so that stable electrical inertia control is realized by the control circuit of FIG. 4. Thus, it is possible to increase the response of the electrical inertia control by the input-side control device 5 up to about the response frequency fc.

$$Pc(s) = 1 + c1\left(\frac{s}{2\pi fc}\right) + c2\left(\frac{s}{2\pi fc}\right)^2 + c3\left(\frac{s}{2\pi fc}\right)^3 \quad (9)$$

The following equations (10-1) to (10-3) each show a specific setting example of the filter coefficients a1, a2, and b1 in the input-side control device 5 according to the present embodiment. In the following equations (10-1) to (10-3), J1 is the moment of inertia from the input-side dynamometer 21 to the input-side shaft torque detector 24, and J2 is the moment of inertia of the test piece W, for which design values are used, respectively.

$$(2\pi fc)^2 \cdot a2 = \frac{c3 \cdot (J2 + Jset) \cdot Ki}{(J1 + J2) \cdot 2\pi fc} \quad (10-1)$$

$$2\pi fc \cdot a1 = \frac{(J2 + Jset) \cdot Ki \cdot (-c3 \cdot J2 \cdot Ki + c2 \cdot (J1 + J2) \cdot 2\pi fc)}{(J1 + J2)^2 \cdot (2\pi fc)} \quad (10-2)$$

$$2\pi fc \cdot b1 = [c3 \cdot J2^2 \cdot (J2 + Jset) \cdot Ki^3 + (J1 + J2) \cdot 2\pi fc \cdot \\ \{-c2 \cdot J2 \cdot (J2 + Jset) \cdot Ki^2 + (J1 + J2) \cdot \\ 2\pi fc \cdot (c1 \cdot (J2 + Jset) \cdot Ki - (J1 + J2) \cdot 2\pi fc)\}] / [(J1 + J2)^2 \cdot \\ Jset \cdot Ki \cdot (2\pi fc)^2] \quad (10-3)$$

Furthermore, in deriving the above equations (10-1) to (10-3), the control target characteristic (Tsh/Tr) from the input-side torque command signal Tr to the input-side shaft torque detection signal Tsh, and the control target characteristic (ω/Tr) from the input-side torque command signal Tr to the input-side speed detection signal ω are approximated as shown in the following equations (11-1) and (11-2). The following equations (11-1) and (11-2) are derived when the shaft rigidity is infinity in the equations of motion of the two-inertia system obtained by coupling the inertial body characterized by the moment of inertia J1 and the inertial body characterized by the moment of inertia J2 by a shaft. This approximation is reasonable if the response frequency fc of the electrical inertia control as described above is assumed to be sufficiently lower than the resonance frequency fh of the input shaft SI.

$$\frac{Tsh}{Tr} = \frac{J2}{J1 + J2} \quad (11-1)$$

$$\frac{\omega}{Tr} = \frac{1}{(J1 + J2) \cdot s} \quad (11-2)$$

In deriving the above equations (10-1) to (10-3), the transfer function Ge0(s) of the third input signal generating unit 53 is approximated as 0, and the value of the weight signal w is set to 1. Since the transfer function Ge0(s) has a resonance suppressing effect of suppressing the resonance at the resonance frequency fh of the input shaft SI as described above, the gain has a band-pass characteristic which decreases at the lower frequency side than the resonance frequency fh. Therefore, in deriving the above equations (10-1) to (10-3), the approximation where the transfer function Ge0(s) is 0 is reasonable.

Next, the effect of generating the second input signal by weighting the filter signal ω_f of the input-side speed detection signal ω by the weight signal w in the second input signal generating unit 52 will be described with reference to FIGS. 8 and 9.

Figure 8:
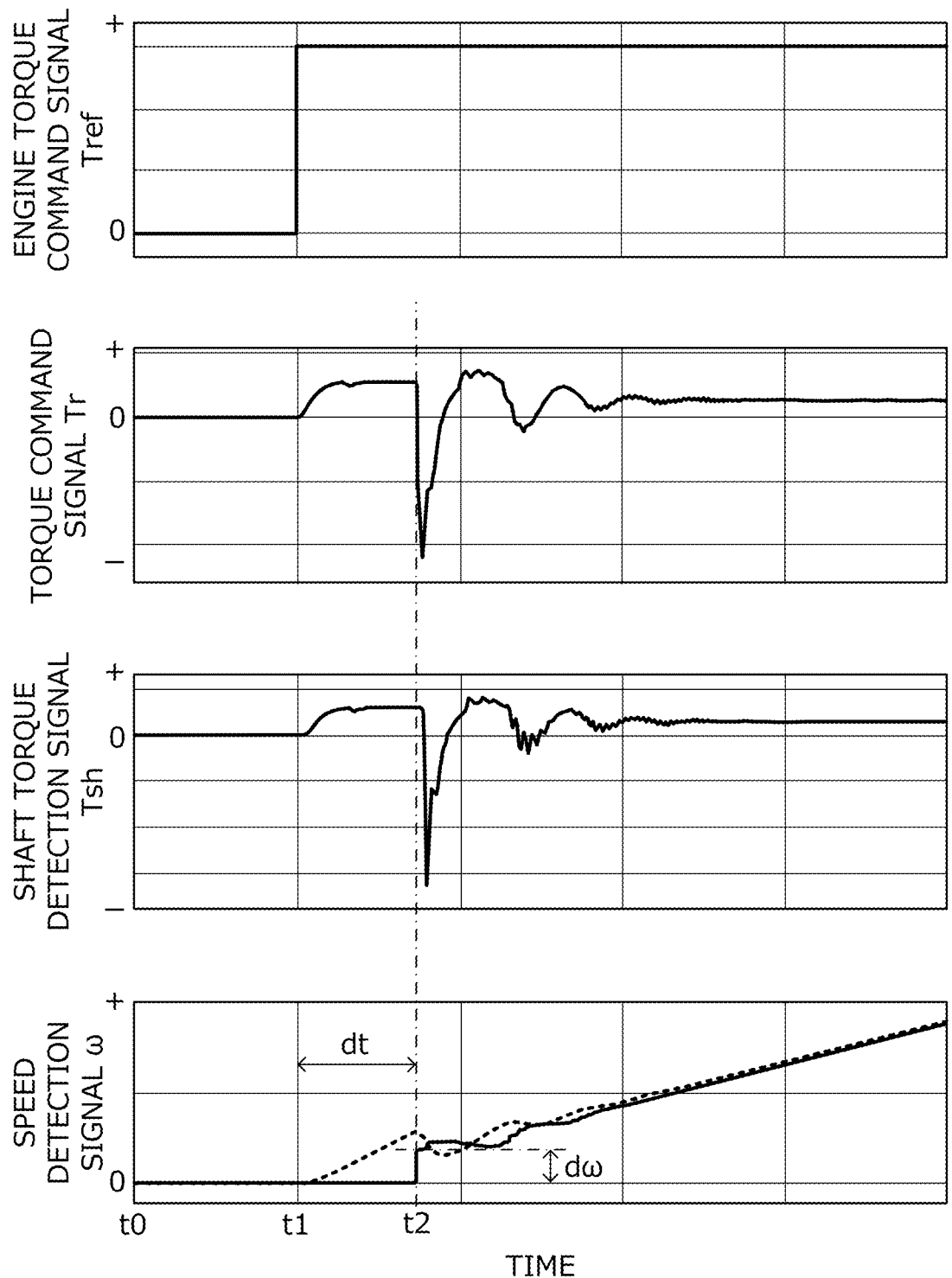
FIG. 8 provides time charts, each showing a control example at the time of rotation rise by a conventional input-side control device.

FIG. 8 provides time charts, each showing a control example at the time of rotation rise by a conventional input-side control device. Here, the conventional input-side control device is different from the input-side control device 5 of FIG. 4 in that the conventional input-side control device does not include the weight setting section 522 and the weight multiplier section 523. That is, the conventional input-side control device corresponds to the case of continuing the value of the weight signal w to be 1 constantly in the input-side control device 5 of FIG. 4.

Furthermore, FIG. 8 and FIG. 9, which will be described later, each show changes in the engine torque command signal Tref (the top row in FIG. 4), the input-side torque command signal Tr (the second row from the top row in FIG. 4), the input-side shaft torque detection signal Tsh (the third row from the top row in FIG. 4), and the input-side speed detection signal ω (the bottom row in FIG. 4) when the value of the engine torque command signal Tref is changed in a step-wise manner from 0 to a predetermined positive value at time t1 from a state in which the input-side dynamometer 21 is stationary and the shaft torque is not acting at time t0. Furthermore, the bottom row of each of FIGS. 8 and 9 shows the actual rotational speed of the output shaft of the input-side dynamometer 21 by a broken line for reference.

As shown in FIG. 8, when the value of the engine torque command signal Tref is increased in a step-wise manner at time t1, the conventional input-side control device increases the value of the torque command signal Tr from 0 so as to follow the increase of the engine torque command signal Tref. Furthermore, by increasing the value of the torque command signal Tr in this way from 0, the rotational speed of the output shaft of the input-side dynamometer 21 also begins to increase, and thus the value of the input-side shaft torque detection signal Tsh also begins to increase.

However, as described above, the input-side speed detection signal w outputted from the input-side speed detector 23 is slower in rising from 0 than the input-side shaft torque detection signal Tsh outputted from the input-side shaft torque detector 24. Therefore, as shown in FIG. 8, the value of the input-side speed detection signal w shows substantially 0 even after the input-side shaft torque detection signal Tsh or the actual rotational speed of the input-side dynamometer 21 starts to increase from 0 immediately after the time t1. Furthermore, the value of the input-side speed detection signal ω increases in a step-wise manner from 0 at time t2 by a predetermined rising width dω from when the actual rotational speed starts to increase from 0 immediately after time t1, after a predetermined delay time dt has elapsed.

It should be noted that, when employing an incremental encoder as the input-side speed detector 23, the delay time dt and the rising width dω of the input-side speed detection signal ω at the time of rotation rise varies depending on the resolution of the incremental encoder, the rotational speed at the time of rotation rise, or the like of the input-side dynamometer 21. That is, the delay time dt and the rising width dω) become larger as the resolution of the incremental encoder becomes lower, and the delay time dt and the rising width dω also tend to increase as the rotational speed at the rotation rise of the input-side dynamometer 21 becomes slower.

Thus, the value of the input-side speed detection signal ω at time t2 rapidly increases. Therefore, in the conventional input-side control device as shown in FIG. 8, the value of the second input signal rapidly increases from 0 to a positive predetermined value, and thus, the value of the torque command signal Tr and the value of the input-side shaft torque detection signal Tsh decrease rapidly to negative predetermined values. Thus, in the conventional input-side control device, due to the input-side speed detection signal ω rising from 0 rapidly in a delayed manner after the input shaft torque detection signal Tsh, the torque command signal Tr, the input-side shaft torque detection signal Tsh, and the input-side speed detection signal ω oscillate as shown in FIG. 8.

Figure 9:
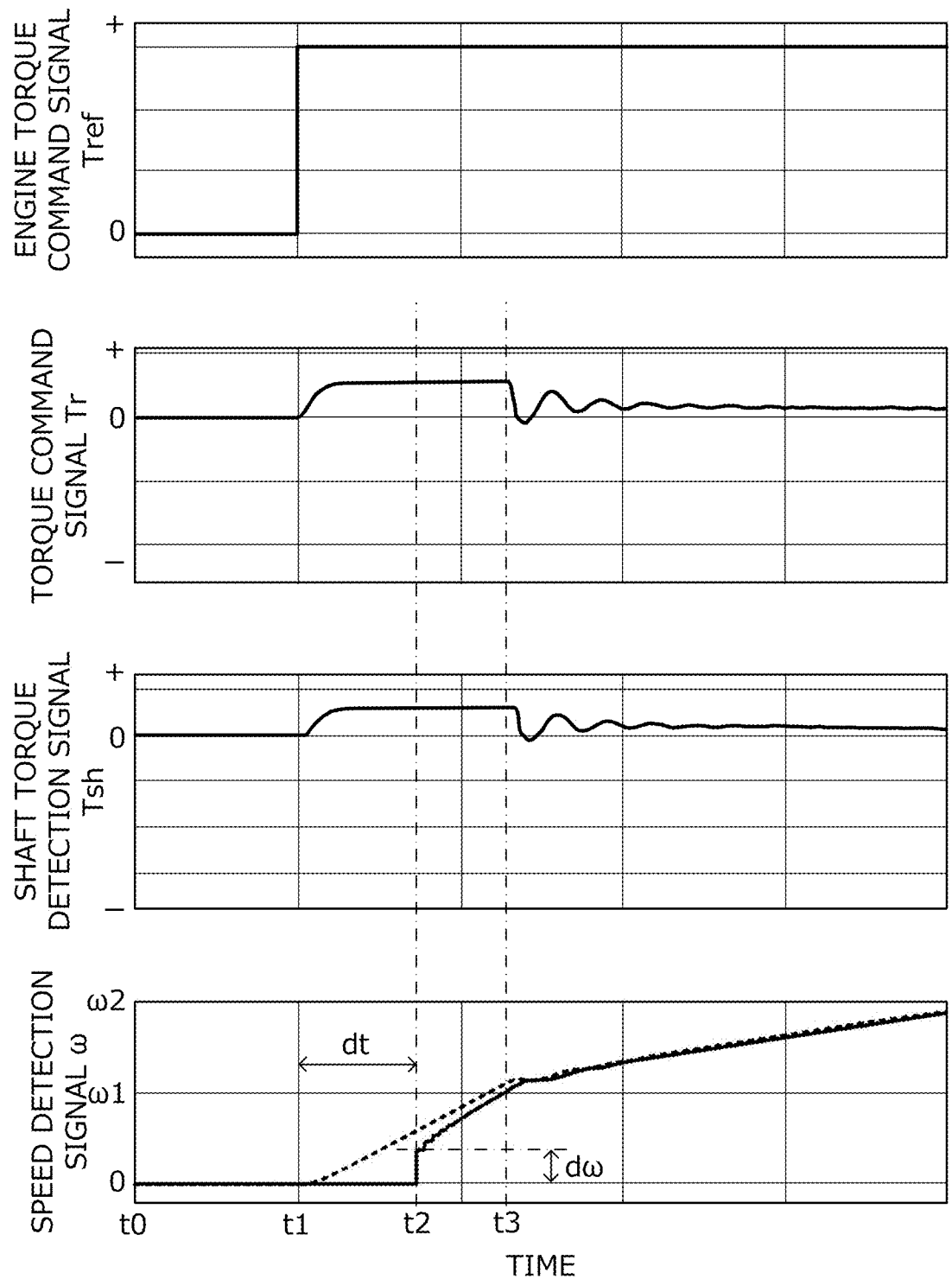
FIG. 9 provides time charts, each showing a control example at the time of rotation rise by the input-side control device according to the above embodiment.

FIG. 9 provides time charts, each showing a control example at the time of rotation rise by the input-side control device 5 according to the present embodiment. It should be noted that, in the control example of FIG. 9, the first threshold value ω1 is set to a value larger than the largest value among the values assumed as the rising width dω. Furthermore, the second threshold value ω2 is set to a value larger than the first threshold value ω1, and lower than the idle rotational speed of the engine in the completed vehicle in which the test piece W is mounted.

As shown in FIG. 9, the value of the input-side speed detection signal ω increases in a step-wise manner from 0 at time t2 by the rising width dω from when the actual rotational speed starts to increase from 0 immediately after time t1, after the delay time dt has elapsed. Thus, the behavior up to time t2 is substantially the same as that of the control example by the conventional input-side control device shown in FIG. 8. However, the input-side control device 5 according to the present embodiment generates the second input signal by weighting the filter signal ω_f of the input-side speed detection signal w with the weight signal ω. Furthermore, as shown in FIG. 7, while the value of the filter signal ω_f is less than the first threshold ω1 set to a value larger than the rising width dω as described above, the value of the weight signal w is set to 0. Therefore, even if the value of the input-side speed detection signal ω at time t2 increases in a step-wise manner by the rising width dω, the value of the second input signal is maintained at 0. Therefore, as shown in FIG. 9, the value of the input-side torque command signal Tr and the value of the input-side shaft torque detection signal Tsh are maintained constant even when the value of the input-side speed detection signal ω increases rapidly at time t.

Furthermore, as shown in FIG. 9, in response to the event of the value of the filter signal ω_f becoming equal to or greater than the first threshold value ω1 at time t3, the value of the weight signal w starts to increase from 0 at time t3 and thereafter. Therefore, at time t3 and thereafter, the value of the second input signal also starts to increase from 0, such that the value of the input-side torque command signal Tr and the value of the input-side shaft torque detection signal Tsh slightly oscillate as shown in FIG. 9. However, in the present embodiment, since the value of the weight signal w gradually increases from 0, as shown in FIG. 7, the amplitudes of the oscillations of the input-side torque command signal Tr and the input-side shaft torque detection signal Tsh are suppressed to be sufficiently small as compared with the control example by the conventional input-side control device shown in FIG. 8.

The input-side control device 5 according to the present embodiment has the following effects.

(1) In the input-side control device 5, the second input signal generating unit 52 makes the value of the weight signal w when the value of the filter signal ω_f of the input-side speed detection signal w is less than the first threshold value ω1 or the second threshold value ω2 (i.e., when it is in the low rotation range of the idle rotational speed or less) smaller than the value of the weight signal w when the value of the filter signal ω_f is equal to or greater than the threshold value ω1 or ω2 (i.e., when it is in the high rotation range). Thus, even when the value of the input-side speed detection signal ω in the low rotation range rapidly increases, it is possible to suppress the input-side torque command signal Tr and the input-side shaft torque detection signal Tsh from oscillating.

(2) In the input-side control device 5, as the input-side speed detector 23 for detecting the rotational speed of the input-side dynamometer 21, an incremental encoder is used which generates, as the input-side speed detection signal ω, a pulse signal having a frequency according to the amount of rotational displacement when the output shaft rotates. The incremental encoder has the advantage of being inexpensive among known speed detectors such as absolute encoders and resolvers. However, with the incremental encoder, there is a problem in that, immediately after the rotation shaft starts to rotate from a stationary state, since the number of pulses is insufficient, the delay at the time of rising from 0 becomes particularly remarkable. In contrast, according to the input-side control device 5, by changing the value of the weight signal w in accordance with the value of the filter signal ω_f of the input-side speed detection signal ω as described above, since the input-side torque command signal Tr and the input-side torque detection signal Tsh in the low rotation range can be suppressed from oscillating, the disadvantage caused by using the incremental encoder as the input-side speed detector 23 will not be realized.

(3) In the input-side control device 5, the second input signal generating unit 52 sets the value of the weight signal w according to the value of the filter signal ω_f obtained by allowing the input-side speed detection signal ω to pass through the second low-pass filter 521, and multiplies the value of the weight signal w and the set inertia Jset by the value of the filter signal ω_f, thereby generating a second input signal. Thus, even when the value of the input-side speed detection signal ω in the low rotation range rapidly increases, it is possible to suppress the input-side torque command signal Tr and the input-side shaft torque detection signal Tsh from oscillating.

(4) In the input-side control device 5, the weight setting section 522 sets the value of the weight signal w to 0 when the value of the filter signal ω_f of the input-side speed detection signal ω is equal to or greater than 0 and less than the first threshold ω1, sets the value of the weight signal w to 1 when the value of the filter signal ω_f is equal to or greater than the second threshold ω2, and sets the value of the weight signal w to a value proportional to the value of the filter signal ω_f between 0 and 1 when the value of the filter signal ω_f is equal to or greater than the first threshold ω1 and less than the second threshold ω2. Thus, in the low rotation range in which the value of the filter signal ω_f of the input-side speed detection signal ω is less than the second threshold value ω2, it is possible to appropriately change the value of the weight signal w according to the value of the filter signal ω_f. Therefore, even when the value of the input-side speed detection signal ω rapidly increases in the low rotation range, it is possible to suppress the input-side torque command signal Tr and the input-side shaft torque detection signal Tsh from oscillating.

Second Embodiment

Figure 10:
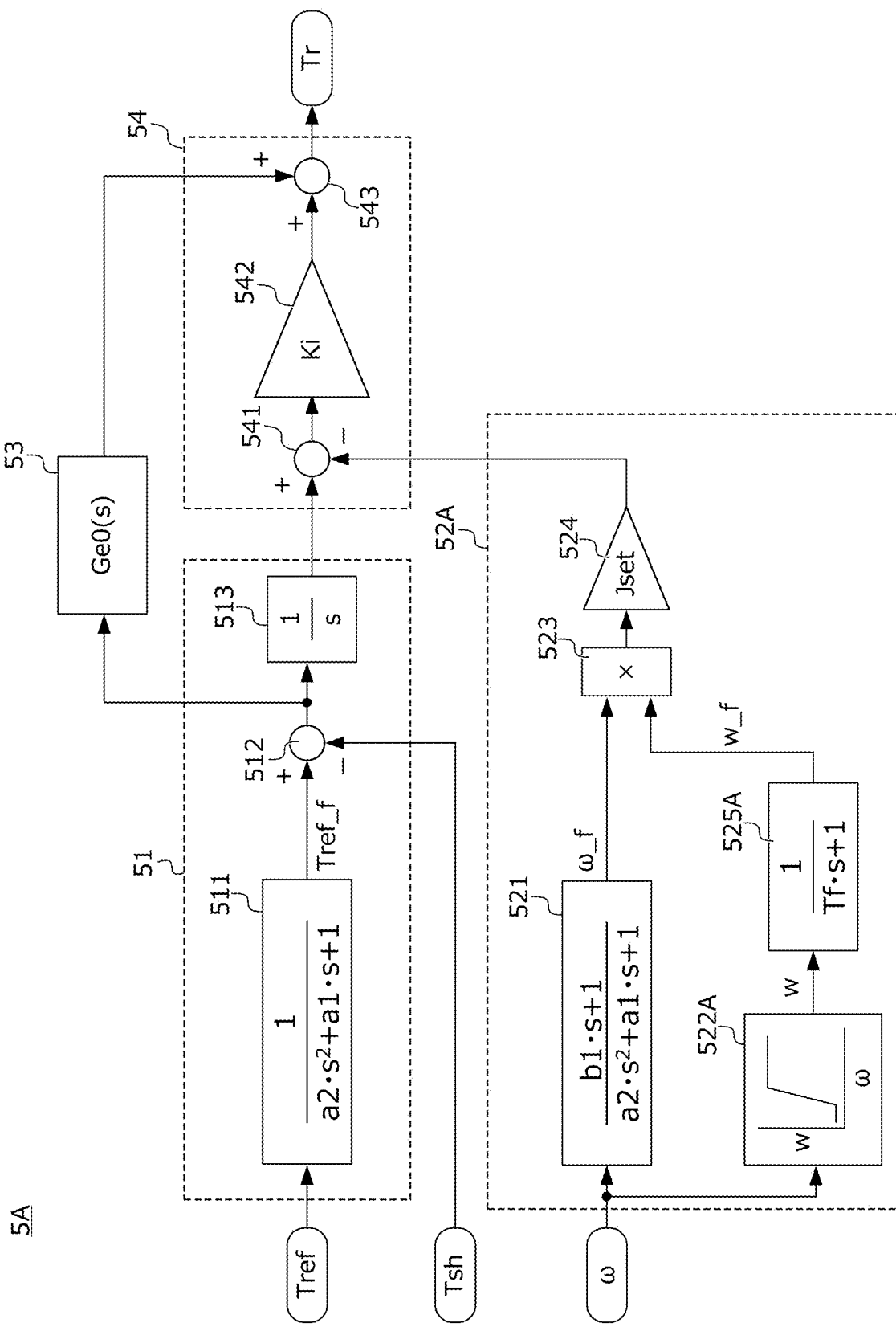
FIG. 10 is a block diagram showing a configuration of a control circuit of the input-side control device according to a second embodiment of the present invention.

Next, a second embodiment of the present invention will be described in detail with reference to the drawings. FIG. 10 is a diagram showing the configuration of a control circuit of an input-side control device 5A according to the present embodiment. FIG. 10 particularly shows a portion of the control circuit included in the input-side control device 5A, the portion being responsible for the electrical inertia control of the input-side dynamometer. As shown in FIG. 10, the input-side control device 5A differs from the input-side control device 5 shown in FIG. 4 in the configuration of the second input signal generating unit 52A. In the following description of the input-side control device 5A, the same components as those of the input-side control device 5 shown in FIG. 4 are denoted by the same reference numerals, and a detailed description thereof is omitted.

The second input signal generating unit 52A includes a second low-pass filter 521, a weight setting section 522A, a weight multiplier section 523, a setting inertial multiplier section 524, and a third low-pass filter 525A.

The weight setting section 522A generates a weight signal w set to a value between 0 and 1 in accordance with the input-side speed detection signal ω, and outputs the weight signal w to the third low-pass filter 525A. More specifically, the weight setting section 522A includes a control map that associates a value of the input-side speed detection signal ω with the value of the weight signal w, and sets the value of the weight signal w by searching the control map based on the value of the input-side speed detection signal ω.

Figure 11:
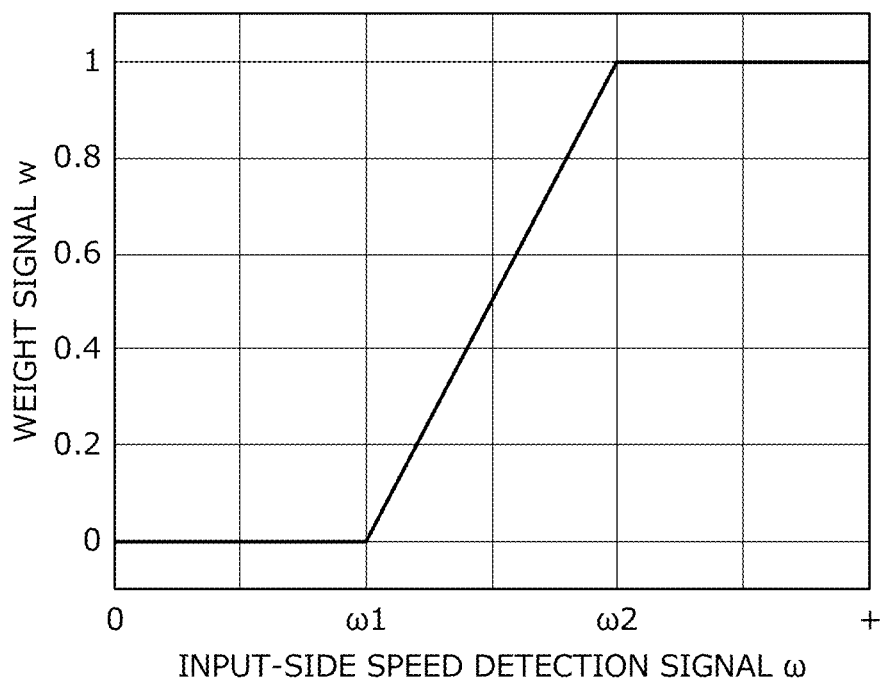
FIG. 11 is an example of a control map that determines the value of a weight signal.

FIG. 11 is an example of a control map for determining the value of the weight signal w. As shown in FIG. 11, in the weight setting section 522A, when the value of the input-side speed detection signal ω is equal to or greater than 0, and less than the first threshold ω1, the value of the weight signal w is set to 0, which is the minimum value; when the value of the input-side speed detection signal ω is equal to or greater than the second threshold ω2, the value of the weight signal w is set to 1, which is a maximum value; and when the value of the input-side speed detection signal ω is equal to or greater than the first threshold ω1 and less than the second threshold ω2, the value of the weight signal w is set to a value proportional to the value of the input-side speed detection signal ω between 0 and 1. In other words, in the weight setting section 522A, when the value of the input-side speed detection signal ω is less than the first threshold value ω1, the value of the weight signal w is made smaller than when the value of the input-side speed detection signal ω is equal to or greater than the first threshold value ω1. Furthermore, when the value of the input-side speed detection signal ω is less than the second threshold value ω2, the weight setting section 522A makes the value of the weight signal w smaller than when the value of the input-side speed detection signal ω is equal to or greater than the second threshold value ω2. It should be noted that the first threshold value ω1 is set to a value larger than the largest value among the values assumed as the rising width dω in the same manner as in the first embodiment. Similar to the first embodiment, the second threshold value ω2 is also set to a value larger than the first threshold value ω1, and lower than the idle rotational speed of the engine in the completed vehicle in which the test piece W is mounted.

In addition, in the present embodiment, a case will be described in which the value of the weight signal w is set based on the value of the input-side speed detection signal ω as described above; however, the present invention is not limited thereto. The value of the weight signal w may be set based on a parameter proportional to the rotational speed of the output shaft of the input-side dynamometer 21. For example, the value of the weight signal w may be set based on the value of the filter signal ω_f obtained by allowing the second low-pass filter 521 to pass through the input-side speed detection signal ω.

The third low-pass filter 525A attenuates the high-frequency components from the weight signal w and allows the low-frequency components to pass therethrough. In the following, the output signal of the third low-pass filter 525A, i.e., the filter signal obtained by allowing the weight signal w to pass through the third low-pass filter 525A, and attenuating the high-frequency components, is referred to as w_f. The filter signal w_f of the weight signal w is inputted to the weight multiplier section 523. As shown in the following Equation (12), the transfer function GLPF3(s) of the third low-pass filter 525A is a first-order low-pass filter which attenuates the high-frequency components higher than the cut-off frequency 1/Tf from the weight signal w, and allows the low-frequency components to pass therethrough lower than the cut-off frequency 1/Tf. It should be noted that the cutoff frequency 1/Tf of the third low-pass filter 525A is set lower than the cutoff frequency of the second low-pass filter 521 so that the third low-pass filter 525A attenuates lower frequency components than the second low-pass filter 521 attenuates.

$$GLPF3(s) = \frac{1}{Tf \cdot s + 1} \quad (12)$$

The weight multiplier section 523 outputs a result obtained by multiplying the filter signal ω_f of the input-side speed detection signal ω by the filter signal w_f of the weight signal w, to the setting inertial multiplier section 524. The setting inertial multiplier section 524 generates a second input signal by multiplying the output signal of the weight multiplier section 523 by the set inertia Jset, and inputs the second input signal to the torque command signal generating unit 54.

As described above, the second input signal generating unit 52A generates the second input signal by weighting the filter signal ω_f of the input-side speed detection signal ω by the filter signal w_f and the set inertia Jset of the weight signal w.

Next, the effect of weighting by the filter signal w_f of the weight signal w in the second input signal generating unit 52A will be described with reference to FIGS. 9 and 12.

Figure 12:
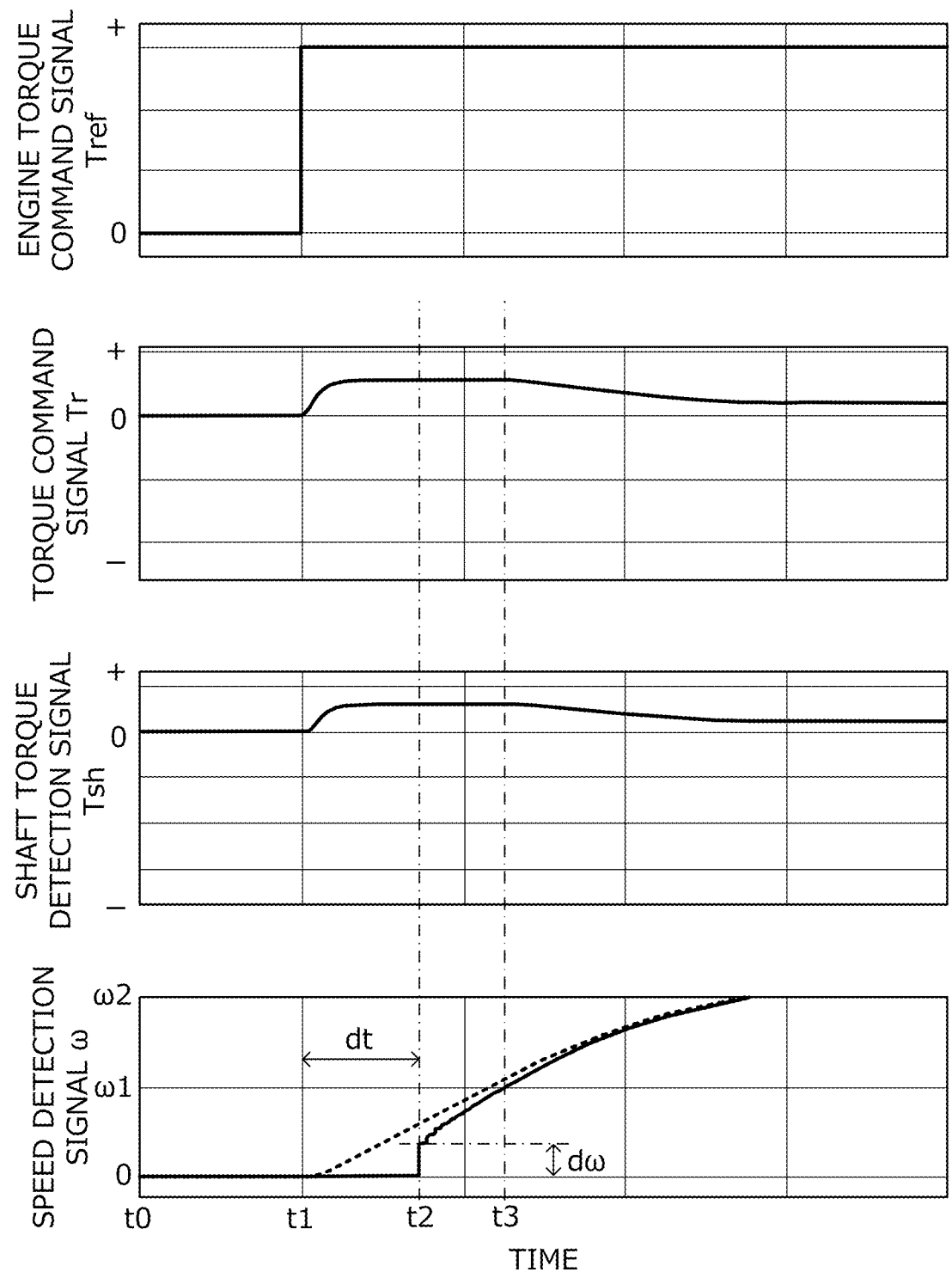
FIG. 12 is a block diagram showing the configuration of a control circuit of the input-side control device according to the above embodiment.

FIG. 12 provides time charts showing a control example at the time of rotational rise by the input-side control device 5A according to the present embodiment. It should be noted that FIG. 12 shows changes in the engine torque command signal Tref (the top row in FIG. 12), the input-side torque command signal Tr (the second row from the top row in FIG. 12), the input-side shaft torque detection signal Tsh (the third row from the top row in FIG. 12), and the input-side speed detection signal ω (the bottom row in FIG. 12) when the value of the engine torque command signal Tref is changed in a step-wise manner by the same procedures as those in the examples shown in FIGS. 8 and 9 described above.

As shown in FIG. 12, the value of the input-side speed detection signal ω increases in a step-wise manner from 0 at time t2 by the rising width dω from when the actual rotational speed starts to increase from 0 immediately after time t1, after the delay time dt has elapsed, and then becomes equal to or greater than the first threshold value ω1 at time t3. Thus, the behavior up to time t3 is substantially the same as that of the control example by the input-side control device 5 according to the first embodiment shown in FIG. 9.

As described here with reference to FIG. 9, in the input-side control device 5 according to the first embodiment, the value of the torque command signal Tr and the value of the input-side shaft torque detection signal Tsh after time t3 slightly oscillate. This is caused from, in the input-side control device 5 without the third low-pass filter 525A, the weight signal w begins to fluctuate at a frequency of about the response frequency fc of the electric-inertia control after time t3.

On the contrary, the input-side control device 5A according to the present embodiment generates the weight signal w based on the input-side speed detection signal ω, and furthermore, weights the filter signal ω_f of the input-side speed detection signal ω by allowing the weight signal w to pass through the third low-pass filter 525A. As described above, the cutoff frequency 1/Tf of the third low-pass filter 525A is set to be lower than the cutoff frequency of the second low-pass filter 521. Therefore, in the input-side control device 5A, since it is possible to suppress the fluctuation of the filter signal w_f of the weight signal w below the lower cutoff frequency 1/Tf than the response frequency fc of the electric inertia control after time t3, it is also possible to suppress the oscillation of the torque command signal Tr and the input-side shaft torque detection signal Tsh after time t3 as shown in FIG. 12.

According to the input-side control device 5A of the present embodiment, the following effects are obtained in addition to the effects (1) and (2) described above.

(5) In the input-side control device 5A, the second input signal generating unit 52A sets the value of the weight signal w according to the value of the input-side speed detection signal ω, and multiplies the value of the filter signal ω_f obtained by allowing the input-side speed detection signal ω to pass through the second low-pass filter 521 by the set inertia Jset and the value of the filter signal ω_f obtained by allowing the weight signal w to pass through the third low-pass filter 525A, thereby generating a second input signal. Thus, even when the value of the input-side speed detection signal ω in the low rotation range rapidly increases, it is possible to suppress the input-side torque command signal Tr and the input-side shaft torque detection signal Tsh from oscillating. Furthermore, the second input signal generating unit 52A can finely adjust the degree of change of the second input signal when the rotational speed of the input-side dynamometer 21 rises from 0 by using the two low-pass filters of the second low-pass filter 521 and the third low-pass filter 525A. Therefore, it is possible to further suppress the oscillation of the input-side torque command signal Tr and the input-side torque detection signal Tsh oscillation than the input-side control device 5 according to the first embodiment.

(6) In the input-side control device 5A, the third low-pass filter 525A attenuates lower frequency components than the second low-pass filter 521 attenuates. Thus, it is possible to further suppress the oscillation of the input-side torque command signal Tr and the input-side shaft torque detection signal Tsh when the rotational speed of the input-side dynamometer 21 rises from 0.

(7) In the input-side control device 5A, the weight setting section 522A sets the value of the weight signal w to 0 when the value of the input-side speed detection signal ω is equal to or greater than 0 and less than the first threshold ω1, sets the value of the weight signal w to 1 when the value of the input-side speed detection signal ω is equal to or greater than the second threshold ω2, and sets the value of the weight signal w to be proportional to the value of the input-side speed detection signal ω between 0 and 1 when the value of the input-side speed detection signal ω is equal to or greater than the first threshold ω1 and less than the second threshold ω2. Thus, in the low rotation range in which the value of the input-side speed detection signal ω is less than the second threshold value ω2, it is possible to appropriately change the value of the weight signal w according to the value of the input-side speed detection signal ω. Therefore, even when the value of the input-side speed detection signal ω is rapidly changed in the low rotation range, it is possible to suppress the input-side torque command signal Tr and the input-side shaft torque detection signal Tsh from oscillating.

While the first and second embodiments of the present invention have been described above, the present invention is not limited thereto. The configuration of detailed parts may be modified as appropriate within the scope of the gist of the present invention. For example, in the first embodiment (or the second embodiment), a case is described in which the second input signal generating unit 52 (or the second input signal generating unit 52A) multiplies the filter signal ω_f of the input-side speed detection signal ω by the weight signal w (or the filter signal w_f) and the set inertia Jset, and changes the value of the weight signal w (or the filter signal w_f) by the value of the filter signal ω_f (or the input-side speed detection signal ω) while the set inertia Jset is fixed at a constant value. However, the present invention is not limited to this. A similar effect can be exerted by, for example, multiplying the filter signal ω_f of the input-side speed detection signal ω by only the set inertia Jset, to change the set inertia Jset by the value of the filter signal ω_f (or the input-side speed detection signal ω).

EXPLANATION OF REFERENCE NUMERALS

1 . . . test system
21 . . . input-side dynamometer (dynamometer)
22 . . . input-side inverter (inverter)
23 . . . input-side speed detector (speed detector)
24 . . . input-side shaft torque detector (shaft torque detector)
5, 5a . . . input-side control device (dynamometer control device)
51 . . . first input signal generating unit
52, 52a . . . second input signal generating unit
521 . . . second low-pass filter (filter, first filter)
522, 522a . . . weight setting section
523 . . . weight multiplier section (multiplier section)
524 . . . setting inertial multiplier section (multiplier section)
525a . . . third low-pass filter (second filter)
53 . . . third input signal generating unit
54 . . . torque command signal generating unit
w . . . test piece
SI . . . input shaft
SO1, SO2 . . . output shaft

The invention claimed is:

1. A dynamometer control device for controlling a test system including:
a dynamometer coupled to an input shaft of a test piece provided with the input shaft and an output shaft;
an inverter that supplies electric power according to a torque command signal to the dynamometer;
a speed detector that generates a speed detection signal according to a rotational speed of the dynamometer; and
a shaft torque detector that generates a shaft torque detection signal according to a shaft torque acting on the input shaft,
the dynamometer control device being configured to generate the torque command signal by using a higher order command signal of the torque command signal, the speed detection signal, and the shaft torque detection signal, the dynamometer control device comprising:
a first input signal generating unit that generates a first input signal based on a deviation between the higher order command signal and the shaft torque detection signal;
a second input signal generating unit that generates a second input signal based on the speed detection signal weighted by a predetermined weight signal; and
a torque command signal generating unit that generates the torque command signal based on the first input signal and the second input signal,
wherein the second input signal generating unit makes a value of the weight signal when a value of the speed detection signal or a value of a filter signal obtained by passing the speed detection signal through a speed signal filter is less than a threshold value smaller than a value of the weight signal when the value of the speed detection signal or the value of the filter signal is equal to or greater than the threshold value, and
wherein the speed detection signal is slower in rising from 0 than the shaft torque detection signal.

2. The dynamometer control device according to claim 1, wherein the speed detector comprises an incremental encoder that generates, as the speed detection signal, a pulse signal having a frequency according to an amount of rotational displacement when the output shaft of the dynamometer rotates.

3. The dynamometer control device according to claim 1, wherein the speed signal filter attenuates high frequency components from the speed detection signal and allows low frequency components to pass therethrough, and
wherein the second input signal generating unit includes:
the speed signal filter;
a weight setting section that outputs the weight signal having a value according to a value of an output signal of the speed signal filter; and
a multiplier section that generates the second input signal by multiplying the output signal of the speed signal filter by the weight signal and a predetermined set inertia.

4. The dynamometer control device according to claim 3, wherein the weight setting section sets the value of the weight signal to 0 when the value of the output signal of the speed signal filter is equal to or greater than 0 and less than a first threshold value, sets the value of the weight signal to 1 when the value of the output signal of the speed signal filter is equal to or greater than a second threshold value which is larger than the first threshold value, and sets the value of the weight signal to a value proportional to the value of the output signal of the speed signal filter between 0 and 1 when the value of the output signal of the speed signal filter is equal to or greater than the first threshold value and less than the second threshold value.

5. The dynamometer control device according to claim 1, wherein the speed signal filter attenuates high frequency components from the speed detection signal and allows low frequency components to pass therethrough, and
wherein the second input signal generating unit includes:
the speed signal filter;
a weight setting section that outputs the weight signal having a value according to a value of the speed detection signal;
a weight signal filter that attenuates high frequency components from the weight signal and causes low frequency components to pass therethrough; and
a multiplier section that generates the second input signal by multiplying an output signal of the speed signal filter by an output signal of the weight signal filter and a predetermined set inertia.

6. The dynamometer control device according to claim 5, wherein the weight signal filter attenuates lower frequency components than the speed signal filter attenuates.

7. The dynamometer control device according to claim 5, wherein the weight setting section sets the value of the weight signal to 0 when the value of the speed detection signal is equal to or greater than 0 and less than a first threshold value, sets the value of the weight signal to 1 when the value of the speed detection signal is equal to or greater than a second threshold value which is larger than the first threshold value, and sets the value of the weight signal to a value proportional to the value of the speed detection signal between 0 and 1 when the value of the speed detection signal is equal to or greater than the first threshold value and less than the second threshold value.

8. The dynamometer control device according to claim 2, wherein the speed signal filter attenuates high frequency components from the speed detection signal and allows low frequency components to pass therethrough, and
wherein the second input signal generating unit includes:
the speed signal filter;
a weight setting section that outputs the weight signal having a value according to a value of an output signal of the speed signal filter; and
a multiplier section that generates the second input signal by multiplying the output signal of the speed signal filter by the weight signal and a predetermined set inertia.

9. The dynamometer control device according to claim 8, wherein the weight setting section sets the value of the weight signal to 0 when the value of the output signal of the speed signal filter is equal to or greater than 0 and less than a first threshold value, sets the value of the weight signal to 1 when the value of the output signal of the speed signal filter is equal to or greater than a second threshold value which is larger than the first threshold value, and sets the value of the weight signal to a value proportional to the value of the output signal of the speed signal filter between 0 and 1 when the value of the output signal of the speed signal filter is equal to or greater than the first threshold value and less than the second threshold value.

10. The dynamometer control device according to claim 2,
wherein the speed signal filter attenuates high frequency components from the speed detection signal and allows low frequency components to pass therethrough, and
wherein the second input signal generating unit includes:
the speed signal filter;
a weight setting section that outputs the weight signal having a value according to a value of the speed detection signal;
a weight signal filter that attenuates high frequency components from the weight signal and causes low frequency components to pass therethrough; and
a multiplier section that generates the second input signal by multiplying an output signal of the speed signal filter by an output signal of the weight signal filter and a predetermined set inertia.

11. The dynamometer control device according to claim 10, wherein the weight signal filter attenuates lower frequency components than the speed signal filter attenuates.

12. The dynamometer control device according to claim 6, wherein the weight setting section sets the value of the weight signal to 0 when the value of the speed detection signal is equal to or greater than 0 and less than a first threshold value, sets the value of the weight signal to 1 when the value of the speed detection signal is equal to or greater than a second threshold value which is larger than the first threshold value, and sets the value of the weight signal to a value proportional to the value of the speed detection signal between 0 and 1 when the value of the speed detection signal is equal to or greater than the first threshold value and less than the second threshold value.

13. The dynamometer control device according to claim 10, wherein the weight setting section sets the value of the weight signal to 0 when the value of the speed detection signal is equal to or greater than 0 and less than a first threshold value, sets the value of the weight signal to 1 when the value of the speed detection signal is equal to or greater than a second threshold value which is larger than the first threshold value, and sets the value of the weight signal to a value proportional to the value of the speed detection signal between 0 and 1 when the value of the speed detection signal is equal to or greater than the first threshold value and less than the second threshold value.

14. The dynamometer control device according to claim 11, wherein the weight setting section sets the value of the weight signal to 0 when the value of the speed detection signal is equal to or greater than 0 and less than a first threshold value, sets the value of the weight signal to 1 when the value of the speed detection signal is equal to or greater than a second threshold value which is larger than the first threshold value, and sets the value of the weight signal to a value proportional to the value of the speed detection signal between 0 and 1 when the value of the speed detection signal is equal to or greater than the first threshold value and less than the second threshold value.

* * * * *